United States Patent
Bracken et al.

[19]

[11] Patent Number: 5,980,962
[45] Date of Patent: Nov. 9, 1999

[54] PROCESS OF AND APPARATUS FOR PROVIDING AT LEAST A PARTIAL BARRIER TO MOISTURE VAPOR TRANSFER THROUGH THE SURFACE OF A MATERIAL AND/OR FOR REMOVING MOISTURE FROM A MATERIAL

[75] Inventors: Howard Bracken, Blue Point; Donald Sanderson Thomas, Wollstonecraft, both of Australia

[73] Assignee: Microwave Processing Technologies Pty. Limited, New South Wales, Australia

[21] Appl. No.: 08/750,280

[22] PCT Filed: Jul. 11, 1995

[86] PCT No.: PCT/AU95/00418

§ 371 Date: May 23, 1997

§ 102(e) Date: May 23, 1997

[87] PCT Pub. No.: WO96/02153

PCT Pub. Date: Feb. 1, 1996

[30] Foreign Application Priority Data

Jul. 11, 1994 [AU] Australia ............................. PM 6721
Jul. 11, 1995 [ZA] South Africa ......................... 95/5750

[51] Int. Cl.⁶ ............................. A23L 3/00; H05B 6/00
[52] U.S. Cl. .................... 426/241; 99/451; 99/DIG. 14; 219/411; 219/686; 219/710; 426/242
[58] Field of Search ..................... 426/241, 242, 426/243; 99/451, DIG. 14; 219/411, 678, 686, 710, 711; 34/259, 266, 269

[56] References Cited

U.S. PATENT DOCUMENTS

| | | | |
|---|---|---|---|
| 4,157,403 | 6/1979 | Schiffmann et al. | 426/241 |
| 4,746,968 | 5/1988 | Wear et al. | 34/259 |
| 5,472,721 | 12/1995 | Eisenberg et al. | 426/241 |
| 5,525,782 | 6/1996 | Yoneno et al. | 99/451 |

FOREIGN PATENT DOCUMENTS

| | | | |
|---|---|---|---|
| 54278/94 | 5/1994 | Australia . | |
| 0643261 | 3/1995 | European Pat. Off. . | |
| 3721412 | 1/1989 | Germany | 34/259 |
| 63-148965 | 6/1988 | Japan . | |
| 9109532 | 7/1991 | WIPO . | |
| 9300825 | 1/1993 | WIPO . | |
| 9410857 | 5/1994 | WIPO . | |
| 9512962 | 5/1995 | WIPO . | |

OTHER PUBLICATIONS

Derwent Abstract Accession No. 88–210689, JP, A, 63–148965 (Fuji Sash Co) Jun. 21, 1988.

*Primary Examiner*—George C. Yeung
*Attorney, Agent, or Firm*—Ladas & Parry

[57] ABSTRACT

This invention relates to a process of and apparatus for providing at least a partial barrier to moisture vapor transfer through the surface of a material without substantially spoiling the material, a process of and apparatus for removing moisture from a material without substantially spoiling the material, and a process of and apparatus for providing at least a partial barrier to moisture vapor through the surface of a material and for removing moisture from the material without substantially spoiling the material.

23 Claims, 12 Drawing Sheets

PROCESS OF AND APPARATUS FOR PROVIDING AT LEAST A PARTIAL BARRIER TO MOISTURE VAPOR TRANSFER THROUGH THE SURFACE OF A MATERIAL AND/OR FOR REMOVING MOISTURE FROM A MATERIAL

TECHNICAL FIELD

This invention relates to a process of and apparatus for providing at least a partial barrier to moisture vapour transfer through the surface of a material without substantially spoiling the material, a process of and apparatus for removing moisture from a material without substantially spoiling the material, and a process of and apparatus for providing at least a partial barrier to moisture vapour transfer through the surface of a material and for removing moisture from the material without substantially spoiling the material.

BACKGROUND OF THE PRESENT INVENTION

In the snack food and home microwaveable prepared food sectors of the food processing industry are of major world wide economic importance and are rapidly expanding in response to the demand of community changing lifestyles. However, the nutritional and diet value of many of such products and in particular snack foods is widely criticised and is the subject of increasing public concern and market awareness. A major reason for the low nutritional quality of many of the products in the snack food sector is due to the production difficulties which are experienced in the processing of many of the wholesome, basic food products, such as for example, cheeses, meats, fruits, vegetables and berries, into high quality, long shelf life, nutritious, non-chewy, flavoursome products having consumer appeal. Of the many basic food products affected in this manner, cheese is one of the most important due to its availability for processing on a year round basis and because of its high nutritional and energy properties and important contribution to balanced food diets, as a consequence of these processing difficulties, many of the cheese snack products in the market are bland and of poor nutritional value and lack customer appeal. These products often consist of a cereal or similar core material finished in a cheese flavouring or cheese coating. The processed quality of other dried snack food products, such as for example, meats, fruits, vegetables and berries which could be considered as nutritious additives to cheese based snack food products are themselves typically characterised after processing as having tough skins, chewy texture and bland taste devoid of any significant distinguishing flavour or taste. Some processes used in the cooking of foods, and particularly for example that relating to boiling, stewing, baking, leavening, frying, grilling and toasting have ben observed and practised for centuries. Notwithstanding the development of the industrial food processing industry and the introduction of more sophisticated cooking and drying methods and the advent of microwave heating, the food cooking and food processing methods and technologies and operating techniques in use today still remain more of an art than an inventive science. It is known that the processing of cheeses, fruits, meats, vegetables, spices and other agricultural produce having a distinctive taste, texture and aroma, by the use of conventional heating, cooking and drying technologies and methods and processes such as convection ovens, hot air cooking and drying systems, radiant heating and conductance heating systems, all cause changes to the surface properties of the product and volatilise to a greater or lesser degree the low molecular weight compounds which give rise to much of the distinctive properties of the fresh product. It is apparent that there is a need for a processes for removing moisture from a material without substantially spoiling the material.

OBJECT OF INVENTION

Objects of the invention are to provide a process of and apparatus for providing at least a partial barrier to moisture vapour transfer through the surface of a material without substantially spoiling the material, a process of and apparatus for removing moisture from a material without substantially spoiling the material, and a process of and apparatus for providing at least a partial barrier to moisture vapour transfer through the surface of a material and for removing moisture from the material without substantially spoiling the material.

DISCLOSURE OF INVENTION

According to a first embodiment of this invention there is provided a process of providing at least a partial barrier to moisture vapour transfer through the surface of a material without substantially spoiling the material, said process comprising:

(A) subjecting the material to a controlled temperature and humidity environment, said environment being at a temperature and partial vapour pressure of water which do not spoil the material, and, in which the partial vapour pressure of water of said environment is below saturation:

(B) irradiating the material in the environment with infra red radiation, said amount of infra red radiation being sufficient to at least partially seal the surface of the material to provide at least a partial barrier to moisture vapour transfer through the surface of the material without spoiling the material: and (C) maintaining (i) the temperature of the environment, and, (ii) the partial vapour pressure of water of said environment below saturation, whereby the material whereby the material is not spoilt during step (B).

According to a second embodiment of this invention there is provided a process for removing moisture from a material without substantially spoiling the material, said process comprising:

(a) subjecting the material to a controlled humidity environment, said environment being at a temperature and partial vapour pressure of water which do not spoil the material, and, in which the partial vapour pressure of water of said environment is below saturation;

(b) irradiating the material in the environment with an amount of microwave irradiation effective to increase the moisture at the surface of the material whereby the vapour pressure at the surface is greater than the vapour pressure of the environment whereby moisture is transferred from the surface to the environment, wherein the amount of said microwave irradiation is not sufficient to spoil the material; and (c) maintaining (i) the temperature of the environment, and, (ii) the partial vapour pressure of water of said environment below saturation, whereby the material is not spoiled during step (b);

said amount of microwave irradiation being sufficient to substantially maintain said vapour pressure at the surface, until a required amount of moisture has been removed from said material, without reducing the surface temperature of the material more than 50% of the wet bulb depression of the environment.

According to a third embodiment of this invention there is provided a process of providing at least a partial barrier to moisture vapour transfer through the surface of a material and for removing moisture from the material without substantially spoiling the material, said process comprising:

providing at least a partial barrier to moisture vapour transfer through the surface of a material without substantially spoiling the material, said process comprising:

(A) subjecting the material to a controlled temperature and humidity environment, said environment being at a temperature and partial vapour pressure of water which do not spoil the material, and, in which the partial vapour pressure of water of said environment is below saturation;

(B) irradiating the material in the environment with infra red radiation, said amount of infra red radiation being sufficient to at least partially seal the surface of the material to provide at least a partial barrier to moisture vapour transfer through the surface of the material without spoiling the material; and (C) maintaining (i) the temperature of the environment, and, (ii) the partial vapour pressure of water of said environment below saturation, whereby the material whereby the material is not spoilt during step (B): and removing moisture from a material without substantially spoiling the material, said process comprising:

(a) subjecting the material to a controlled humidity environment, said environment being at a temperature and partial vapour pressure of water which do not spoil the material, and, in which the partial vapour pressure of water of said environment is below saturation;

(b) irradiating the material in the environment with an amount of microwave irradiation effective to increase the moisture at the surface of the material whereby the vapour pressure at the surface is greater than the vapour pressure of the environment whereby moisture is transferred from the surface to the environment, wherein the amount of said microwave irradiation is not sufficient to spoil the material; and (c) maintaining (i) the temperature of the environment, and, (ii) the partial vapour pressure of water of said environment below saturation, whereby the material is not spoiled during step (b);

said amount of microwave irradiation being sufficient to substantially maintain said vapour pressure at the surface, until a required amount of moisture has been removed from said material, without reducing the surface temperature of the material more than 50% of the wet bulb depression of the environment.

Advantageously in the process of the first or third embodiments step (B) comprises:

(B) simultaneously or sequentially irradiating the material in the environment with infra red radiation and microwave irradiation, said amount of infra red radiation being sufficient to at least partially seal the surface of the material to provide at least a partial barrier to moisture vapour transfer through the surface of the material without spoiling the material, and said amount of microwave irradiation being sufficient to cause a slight positive vapour pressure within the material to prevent the material from deflating, wherein the amount of said microwave irradiation is not sufficient to spoil the material.

Typically in the process of the first or third embodiments step (A) comprises;

(A) subjecting the material to a controlled pressure, temperature and humidity environment, said environment being at a said environment being at a pressure which does not spoil the material.

Typically in the process of the second or third embodiments;

said amount of microwave irradiation being sufficient to substantially maintain said vapour pressure at the surface, until a required amount of moisture has been removed from said material, without reducing the surface temperature of the material more than 30% of the wet bulb depression of the environment.

More typically in the process of the second or third embodiments:

said amount of microwave irradiation is sufficient to substantially maintain said vapour pressure at the surface, until a required amount of moisture has been removed from said material, without substantial reduction of the surface temperature of the material.

Typically in the process of the second or third embodiments step (a) comprises:

(a) subjecting the material to a controlled temperature and humidity environment, said environment being at a temperature and partial vapour pressure of water which do not spoil the material, and, in which the partial vapour pressure of water of said environment is below saturation:

More typically in the process of the second or third embodiments step (a) comprises:

(a) subjecting the material to a controlled pressure and humidity environment, said environment being at a pressure, temperature and partial vapour pressure of water which do not spoil the material, and, in which the partial vapour pressure of water of said environment is below saturation.

Even more typically in the process of the second or third embodiments step (a) comprises:

subjecting the material to a controlled pressure, temperature and humidity environment, said environment being at a pressure, temperature and partial vapour pressure of water which do not spoil the material, and, in which the partial vapour pressure of water of said environment is below saturation.

Typically in the process of the second or third embodiments in step (b) the temperature of the surface of the material is substantially the same as the dry bulb temperature of the environment.

According to another embodiment of this invention there is provided a process of providing at least a partial barrier to moisture vapour transfer through the surface of a material without substantially spoiling the material, said process comprising:

(A) subjecting the material to a controlled temperature and humidity environment, said environment being at a temperature which is less than that which would spoil the material, and, in which the partial vapour pressure of water of said environment is below saturation;

(B) irradiating the material in the environment with infra red radiation, said amount of infra red radiation being sufficient to at least partially seal the surface of the material to provide at least a partial barrier to moisture vapour transfer through the surface of the material without burning, cooking, or causing surface damage to the material so as to spoil the material; and (C) simultaneously maintaining (i) the temperature of the environment, and, (ii) the partial vapour pressure of water of said environment below saturation, whereby the material does not burn, cook or incur surface damage during step (B) so as to spoil the material.

Typically step (B) comprises:

(B) simultaneously or sequentially irradiating the material in the environment with infra red radiation and microwave irradiation, said amount of infra red radiation being sufficient to at least partially seal the surface of the material to provide at least a partial barrier to moisture vapour transfer through the surface of the material without burning, cooking, or causing surface damage to the material so as to spoil the material, and said amount of microwave irradiation being sufficient to cause a slight positive vapour pressure within the material to prevent the material from deflating, wherein the amount of said microwave irradiation is not sufficient to remove a substantial amount of moisture from the material, burn, cook, or cause surface damage to the material so as to spoil the material.

The material may be irradiated sequentially once or a plurality of times, e.g. 2–10,000, more typically 2 to 5,000, even more typically 2 to 1,000, yet even more typically 2–100 and even more typically 2 to 10 (or even more typically 2 to 50, 2 to 25, 5 to 10 times).

Typically in the step (A) comprises:

(A) subjecting the material to a controlled pressure, temperature and humidity environment, said environment being at a temperature which is less than that which would spoil the material, and, in which the partial vapour pressure of water of said environment is below saturation.

According to a further embodiment of this invention there is provided a process for removing moisture from a material without substantially spoiling the material, said process comprising:

(a) subjecting the material to a controlled humidity environment, said environment being at a temperature which is less than that which would spoil the material, and, in which the partial vapour pressure of water of said environment is below saturation;

(b) irradiating the material in the environment with an amount of microwave irradiation effective to increase the moisture at the surface of the material whereby the vapour pressure at the surface is greater than the vapour pressure of the environment whereby moisture is transferred from the surface to the environment, wherein the amount of said microwave irradiation is not sufficient to spoil the material; and (c) simultaneously maintaining (i) the temperature of the environment, and, (ii) the partial vapour pressure of water of said environment below saturation, whereby the material is not spoiled during irradiation of the material in the environment with microwave irradiation;

said amount of microwave irradiation being sufficient to substantially maintain said vapour pressure at the surface, until a require amount of moisture has been removed from said material, without reducing the surface temperature of the material more than 50% of the wet bulb depression of the environment.

Typically said amount of microwave irradiation being sufficient to substantially maintain said vapour pressure at the surface, until a required amount of moisture has been removed from said material, without reducing the surface temperature of the material more than 30% of the wet bulb depression of the environment.

More typically, said amount of microwave irradiation is sufficient to substantially maintain said vapour pressure at the surface, until a required amount of moisture has been removed from said material, without substantial reduction of the surface temperature of the material.

Even more typically the surface temperature of the material is reduced from a% to b% of the wet bulb depression of the environment where a is selected from the group consisting of a value presented in the column headed "a" in Table A* below at one of entries 1–20, and b is selected from the group of the values presented in the column headed "b" adjacent the corresponding "a" entry.

TABLE A*

| Entry | a    | b                                                      |
|-------|------|--------------------------------------------------------|
| 1     | 0    | 0.5, 0.75, 1, 1.5, 2, 2.5, 3, 3.5, 4, 5, 7.5, 10, 15, 20, 25, 30, 35, 40, 45, 50 |
| 2     | 0.5  | 0.75, 1, 1.5, 2, 2.5, 3, 3.5, 4, 5, 7.5, 10, 15, 20, 25, 30, 35, 40, 45, 50 |
| 3     | 0.75 | 1, 1.5, 2, 2.5, 3, 3.5, 4, 5, 7.5, 10, 15, 20, 25, 30, 35, 40, 45, 50 |
| 4     | 1    | 1.5, 2, 2.5, 3, 3.5, 4, 5, 7.5, 10, 15, 20, 25, 30, 35, 40, 45, 50 |
| 5     | 1.5  | 2, 2.5, 3, 3.5, 4, 5, 7.5, 10, 15, 20, 25, 30, 35, 40, 45, 50 |
| 6     | 2    | 2.5, 3, 3.5, 4, 5, 7.5, 10, 15, 20, 25, 30, 35, 40, 45, 50 |
| 7     | 2.5  | 3, 3.5, 4, 5, 7.5, 10, 15, 20, 25, 30, 35, 40, 45, 50 |
| 8     | 3    | 3.5, 4, 5, 7.5, 10, 15, 20, 25, 30, 35, 40, 45, 50 |
| 9     | 3.5  | 4, 5, 7.5, 10, 15, 20, 25, 30, 35, 40, 45, 50 |
| 10    | 4    | 5, 7.5, 10, 15, 20, 25, 30, 35, 40, 45, 50 |
| 11    | 5    | 7.5, 10, 15, 20, 25, 30, 35, 40, 45, 50 |
| 12    | 7.5  | 10, 15, 20, 25, 30, 35, 40, 45, 50 |
| 13    | 10   | 15, 20, 25, 30, 35, 40, 45, 50 |
| 14    | 15   | 20, 25, 30, 35, 40, 45, 50 |
| 15    | 20   | 25, 30, 35, 40, 45, 50 |
| 16    | 25   | 30, 35, 40, 45, 50 |
| 17    | 30   | 35, 40, 45, 50 |
| 18    | 35   | 40, 45, 50 |
| 19    | 40   | 45, 50 |
| 20    | 45   | 50 |

Typically step (a) comprises:

(a) subjecting the material to a controlled temperature and humidity environment, said environment being at a temperature which is less than that which would spoil the material, and, in which the partial vapour pressure of water of said environment is below saturation.

Step (a) may comprise:

(a) subjecting the material to a controlled pressure and humidity environment, said environment being at a temperature which is less than that which would spoil the material, and, in which the partial vapour pressure of water of said environment is below saturation.

Step (a) may comprise:

(a) subjecting the material to a controlled pressure, temperature and humidity environment, said environment being at a temperature which is less than that which would spoil the material, and, in which the partial vapour pressure of water of said environment is below saturation.

Typically the temperature of the surface of the material is substantially the same as the dry bulb temperature of the environment.

Typically step (A) is preceded by:

(I) preparing the material in a suitable form for processing by the process of the first or third embodiments; and (II) heating or cooling the material of (I) to a preselected temperature said temperature being less than that which would spoil the material and being equal to or less than the temperature of step (A).

Typically step (a) is preceded by:

(I) preparing the material in a suitable form for processing by the process of the second embodiment; and (II) heating or cooling the material of (I) to a preselected temperature said temperature being less than that which would spoil the material and being equal to or less than the temperature of step (a).

Typically step (c) is followed by:
(1) optionally cooling the material;
(2) sterilising the material; and
(3) optionally packaging the material.

In the preferred form a microwave sterilisation process is combined with packaging by the use of microwaveable packaging materials suitable for stable long shelf life food products. In another preferred process the sterilisation process is carried out as part of step (c) followed by a cooling process if required prior to packaging in controlled atmosphere packaging materials commonly used in the food packaging industry. According to another aspect of the invention there is provided as an integral part of the method of production a process for end product sterilisation by microwave radiation. In the preferred embodiment in the invention the sterilisation stage is carried out as an integral part of the final production stage immediately prior to packaging but sterilisation can equally be carried out as an integral part of the product packaging stage by the use of microwaveable long shelf life packaging materials in common use in the industry.

According to a preferred form of the invention there is provided a process of production incorporating the preferred process stages of:

(a) starting material preparation and process presentation delivery stage;

(b) An initial processing stage in which the presented starting material is processed under a controlled temperature and pressure environment (atmospheric or vacuum) using a combination of infra-red radiant heating and microwave irradiation and vapour extraction/condensing closed cycle heat pump drying and controlled product temperature.

(c) A final cooking/drying/puffing/foaming/processing stage as applicable to meet the end product specification and incorporating continuously variable product feed back controlled microwave irradiation in a temperature and pressure controlled (atmosphere or sub-atmospheric) environment complete with vapour extraction/condensing system and emission control;

(d) Product microwave sterilisation and packaging and cooling stage.

According to a fourth embodiment of this invention there is provided an apparatus for providing at least a partial barrier to moisture vapour transfer through the surface of a material without substantially spoiling the material, said apparatus comprising:

(A) means for subjecting the material to a controlled temperature and humidity environment, said environment being at a temperature and partial vapour pressure of water which do not spoil the material, and, in which the partial vapour pressure of water of said environment is below saturation;

(B) means for irradiating the material in the environment with infra red radiation, said amount of infra red radiation being sufficient to at least partially seal the surface of the material to provide at least a partial barrier to moisture vapour transfer through the surface of the material without spoiling the material; and (C) means for maintaining (i) the temperature of the environment, and, (ii) the partial vapour pressure of water of said environment below saturation, whereby the material whereby the material is not spoiled.

According to a fifth embodiment of this invention there is provided an apparatus for removing moisture from a material without substantially spoiling the material, said apparatus comprising:

(a) means for subjecting the material to a controlled humidity environment, said environment being at a temperature and partial vapour pressure of water which do not spoil the material, and, in which the partial vapour pressure of water of said environment is below saturation;

(b) means for irradiating the material in the environment with an amount of microwave irradiation effective to increase the moisture at the surface of the material whereby the vapour pressure at the surface is greater than the vapour pressure of the environment whereby moisture is transferred from the surface to the environment, wherein the amount of said microwave irradiation is not sufficient to spoil the material; and (c) means for maintaining (i) the temperature of the environment, and, (ii) the partial vapour pressure of water of said environment below saturation, whereby the material is not spoiled;

said amount of microwave irradiation being sufficient to substantially maintain said vapour pressure at the surface, until a required amount of moisture has been removed from said material, without reducing the surface temperature of the material more than 50% of the wet bulb depression of the environment.

According to a sixth embodiment of this invention there is provided an apparatus for providing at least a partial barrier to moisture vapour transfer through the surface of a material and for removing moisture from the material without substantially spoiling the material, said apparatus comprising in combination:

an apparatus for providing at least a partial barrier to moisture vapour transfer through the surface of a material without substantially spoiling the material, said apparatus for providing at least a partial barrier to moisture vapour transfer comprising:

(A) means for subjecting the material to a controlled temperature and humidity environment, said environment being at a temperature and partial vapour pressure of water which do not spoil the material, and, in which the partial vapour pressure of water of said environment is below saturation;

(B) means for irradiating the material in the environment with infra red radiation, said amount of infra red radiation being sufficient to at least partially seal the surface of the material to provide at least a partial barrier to moisture vapour transfer through the surface of the material without spoiling the material; and (C) means for maintaining (i) the temperature of the environment, and, (ii) the partial vapour pressure of water of said environment below saturation, whereby the material whereby the material is not spoiled; and apparatus for removing moisture from a material without substantially spoiling the material, said apparatus for removing moisture comprising;

(a) means for subjecting the material to a controlled humidity environment, said environment being at a temperature and partial vapour pressure of water which do not spoil the material, and, in which the partial vapour pressure of water of said environment is below saturation;

(b) means for irradiating the environment with an amount of microwave irradiation effective to increase the moisture at the surface of the material whereby the vapour pressure at the surface is greater than the vapour pressure of the environment whereby moisture is transferred from the surface to the environment, wherein the amount of said microwave irradiation is not sufficient to spoil the material; and (c) means for maintaining (i) the temperature of the environment, and, (ii) the partial vapour pressure of water of said environment below saturation, whereby the material is not spoiled;

said amount of microwave irradiation being sufficient to substantially maintain said vapour pressure at the surface, until a required amount of moisture has been removed from said material, without reducing the surface temperature of the material more than 50% of the wet bulb depression of the environment.

Advantageously in the apparatus of fourth or sixth embodiments (B) comprises;

(B) means for simultaneously or sequentially irradiating the material in the environment with infra red radiation and microwave irradiation, said amount of infra red radiation being sufficient to at least partially seal the surface of the material to provide at least a partial barrier to moisture vapour transfer through the surface of the material without spoiling the material, and said amount of microwave irradiation being sufficient to cause a slight positive vapour pressure within the material to prevent the material from deflating, wherein the amount of said microwave irradiation is not sufficient to spoil the material.

Typically in the apparatus of fourth or sixth embodiments (A) comprises;

(A) means for subjecting the material to a controlled pressure, temperature and humidity environment, said environment being at a said environment being at a pressure which does not spoil the material.

Typically in the apparatus of fifth or sixth embodiments (a) comprises;

means for subjecting the material to a controlled temperature and humidity environment, said environment being at a temperature and partial vapour pressure of water which do not spoil the material, and, in which the partial vapour pressure of water of said environment is below saturation;

Typically in the apparatus of fifth or sixth embodiments (a) comprises;

(a) means for subjecting the material to a controlled pressure and humidity environment, said environment being at a pressure, temperature and partial vapour pressure of water which do not spoil the material, and, in which the partial vapour pressure of water of said environment is below saturation.

Typically in the apparatus of fifth or sixth embodiments (a) comprises;

(a) means for subjecting the material to a controlled pressure, temperature and humidity environment, said environment being at a pressure, temperature and partial vapour pressure of water which do not spoil the material, and, in which the partial vapour pressure of water of said environment is below saturation.

According to another embodiment of this invention there is provided an apparatus for providing at least a partial barrier to moisture vapour transfer through the surface of a material without substantially spoiling the material, said apparatus comprising:

(A) means for subjecting the material to a controlled temperature and humidity environment, said environment being at a temperature which is less than that which would spoil the material, and, in which the partial vapour pressure of water of said environment is below saturation;

(B) means for irradiating the material in the environment with infra red radiation, said amount of infra red radiation being sufficient to at least partially seal the surface of the material to provide at least a partial barrier to moisture vapour transfer through the surface of the material without burning, cooking, or causing surface damage to the material so as to spoil the material: and (C) means for simultaneously maintaining (i) the temperature of the environment, and, (ii) the partial vapour pressure of water of said environment below saturation, whereby the material is not burnt cooked or surface damaged during irradiation of the material in the environment with infra red radiation so as to spoil the material, said means for irradiating the material in the environment with infra red radiation being operatively associated with said means for simultaneously maintaining (i) the temperature of the environment, and, (ii) partial vapour pressure of water of said environment below saturation whereby the material is not burnt cooked or surface damaged during irradiation of the material in the environment with infra red radiation so as to spoil the material.

Typically (B) and (C) comprise:

(B) means for simultaneously or sequentially irradiating the material in the environment with infra red radiation and microwave irradiation, said amount of infra red radiation being sufficient to at least partially seal the surface of the material to provide at least a partial barrier to moisture vapour transfer through the surface of the material without burning, cooking, or causing surface damage to the material so as to spoil the material, and said amount of microwave irradiation being sufficient to cause a slight positive vapour pressure within the material to prevent the material from deflating, wherein the amount of said microwave irradiation is not sufficient to substantially remove moisture from the material, burn, cook, or cause surface damage to the material so as to spoil the material; and (C) means for simultaneously main (i) the temperature of the environment, and, (ii) the partial vapour pressure of water of said environment below saturation, whereby the material does not burn, cook, or experience surface damage so as to spoil the material during simultaneous irradiation of the material in the environment with infra red radiation and microwave irradiation, dsif means for simultaneously or sequentially irradiating the material in the environment with infra red radiation and microwave irradiation being operatively associated with said means for simultaneously maintaining (i) the temperature of the environment, and, (ii) the partial vapour pressure of water of said environment below saturation, whereby the material does not burn, cook, or experience surface damage so as to spoil the material during simultaneous irradiation of the material in the environment with infra red radiation and microwave irradiation.

Typically (A) comprises:

(A) means for subjecting the material to a controlled pressure, temperature and humidity environment, said environment being at a temperature which is less than that which would spoil the material, and, in which the partial vapour pressure of water of said environment is below saturation.

According to a further environment of this invention there is provided an apparatus for removing moisture from a material without substantially spoiling the material, said apparatus comprising:

(a) means for subjecting the material to a controlled humidity environment, said environment being at a temperature which is less than that which would spoil the material, and, in which the partial vapour pressure of water of said environment is below saturation;

(b) means for irradiating the material in the environment with an amount of microwave irradiation effective to increase the moisture at the surface of the material whereby the vapour pressure at the surface is greater than the vapour pressure of the environment whereby moisture is transferred from the surface to the environment, wherein the amount of said microwave irradiation is not sufficient to spoil the material; and (c) means for simultaneously maintaining (i) the temperature of the environment, and, (ii) the partial vapour pressure of water of said environment below saturation whereby the material is not spoilt during irradiation of the material in the environment with microwave irradiation, said means for irradiating the material being operatively associated with said means for simultaneously maintaining (i) the temperature of the environment, and, (ii) the partial vapour pressure of water of said environment below saturation whereby the material is not spoilt during irradiation of the material in the environment with microwave irradiation;

said amount of microwave irradiation being sufficient to substantially maintain said vapour pressure at the surface, until a required amount of moisture has been removed from said material, without reducing the surface temperature of the material more than 50% of the wet bulb depression of the environment.

Typically said amount of microwave irradiation being sufficient to substantially maintain said vapour pressure at the surface, until a required amount of moisture has been removed from said material, without reducing the surface temperature of the material more than 30% of the wet bulb depression of the environment.

More typically, said amount of microwave irradiation is sufficient to substantially maintain said vapour pressure at the surface, until a required amount of moisture has been removed from said material, without substantial reduction of the surface temperature of the material.

Even more typically the surface temperature of the material is reduced from a% to b% of the wet bulb depression of the environment where a is selected from the group consisting of a value presented in the column headed "a" in Table A above at one of entries 1–20, and b is selected from the group of the values presented in the column headed "b" adjacent the corresponding "a" entry.

Typically (a) comprises;

(a) means for subjecting the material to a controlled temperature and humidity environment, said environment being at a temperature which is less than that which would spoil the material, and, in which the partial vapour pressure of water of said environment is below saturation.

More typically (a) may comprise:

(a) means for subjecting the material to a controlled pressure and humidity environment, said environment being at a temperature which is less than that which would spoil the material, and, in which the partial vapour pressure of water of said environment is below saturation.

Typically (a) comprises:

(a) means for subjecting the material to a controlled pressure, temperature and humidity environment, said environment being at a temperature which is less than that which would spoil the material, and, in which the partial vapour pressure of water of said environment is below sat.

Typically the temperature of the surface of the material is substantially the same as the dry bulb temperature of the environment.

Typically (A) includes or in addition to (A) there is:

(I) means for preparing the material in a suitable form for processing; and (II) means for heating or cooling the material of (I) to a preselected temperature said temperature being less than that which would spoil the material and being equal to or less than the temperature of (A).

Typically (a) includes or in addition to (a) there is;

(I) means for preparing the material in a suitable form for processing; and (II) heating or cooling the material of (I) to a preselected temperature said temperature being less than that which would spoil the material and being equal to or less than the temperature of (a).

Typically (c) includes or in addition to (c) there is;

(1) optionally means for cooling the material;
(2) means for sterilising the material; and
(3) optionally means for packaging the material.

In the preferred form a microwave sterilisation process is combined with packaging by the use of microwaveable packaging materials suitable for stable long shelf life food products. In another preferred process the sterilisation process is carried out as part of step (c) of the second or third environment followed by a cooling process if required prior to packaging in controlled atmosphere packaging materials commonly used in the food packaging industry.

The processes of the invention may be carried out under continuous environment and product control and do not incorporate convection heating, cooking or baking or any conventionally understood baking process. The infra red radiation used in the processes and apparatus of the present invention do not heat the atmosphere through which they pass. For heat transfer they rely on the absorption of their radiant energy by the surface of the product which is being radiated. Infra-red rays have only a very minor penetration through the surface of most products. The heat transfer characteristics and efficiency can be calculated by the application of recognised engineering formulae.

In the methods of the second and third embodiments abd aooaratys if the fifth and sixth embodiments "puffing" of some food products including cheeses can be achieved by microwave processing without recourse to the conventional baking process and high air temperatures or the use of leavening agents. This is due to the fact that suitable internal vapour pressures can be generated within the product by controlling the intensity of microwave energy and the processing time. Further by controlling the temperature of the product by microwave energy and controlling the processing atmosphere temperature, pressure and humidity the puffing process can be further controlled due to the surface conditioning of the product. It should be noted that in the invention the processing atmosphere will be maintained at a temperature not exceeding the product temperature and no sensible heating energy passes from the air to the product. This is precisely the reverse of convection cooking.

Some cheeses require additional "surface conditioning" to increase the extent of puffing. This is typically achieved by an infra-red radiant heating process which again eliminates the need for heating energy to pass from the processing atmosphere into the product as would be the case with convection baking.

The use of infra-red radiation in conjunction with microwave processing and integrated temperature control of the product and the processing atmospheric conditions, enables surface conditioning of the product to be achieved without a "cooking and baking step.

The processing steps defined in the embodiments of the invention relate to continuous flow processing. The steps are sequential but may be operated in part or in whole sequentially or simultaneously depending on the specific processing application. The processing apparatus of the invention provides for this flexibility of operation.

The inclusion of electro-magnetic infra-red radiant heating in combination with microwaves and the integrated control of product temperature and the processing atmospheric pressure, temperature and humidity in the first environment is not a convection heating, cooking or baking step.

Using the process of the invention it is possible in many instances to establish and maintain optimum processing conditions for the repetitious commercial production of high quality snack foods, such as for example, the range of cheese and cheese based products referred to in this invention.

Factors which influence the processing of specific products include:

(a) The physical form of the product which is presented for processing, including for example, the unit surface area versus product volume and mass, product consistency, texture, colour and aroma and form and temperature of the presented product and conveying platform characteristics.

(b) The chemical composition of the presented product and the compatibility of the ingredients of a product mixture for simultaneous processing and quality control or otherwise requiring independent pre-treatment.

(c) The environment in which the product is to be processed, for example, in a natural ambient atmospheric pressure environment having no control of dry bulb and wet bulb temperature or alternatively in a controlled ambient environment in which the dry bulb and wet bulb temperatures are controlled or alternatively in a fully controlled environment in which the dry bulb and wet bulb temperatures and operating pressure is controlled at atmospheric pressure or sub-atmospheric (vacuum) pressure as determined principally by the product temperature sensitivities.

(d) The impact of the selected form of process heating and drying at each stage of the production process, including for example, the process impact on the surface condition of the product and its internal structure, the volatilisation of aromatic compounds and the formation and control of product puffing and progressive rate of removal of the product water vapour and product sterilisation to meet the final product specifications on a continuous process basis.

In the processes of the invention the relationship between the process environment temperature and vapour pressure and the product surface temperature and surface vapour pressure is an important relationship and influencing factor in product processing quality control and energy efficiency of the production process.

Puffing of products during processing, as for example, in the production of some cheese products described in the invention, can be induced and controlled by the process of the invention having regard to such factors as for example:

(a) the surface area of the presented product with respect to the volume and mass of material contained.

(b) the method and form and physical and chemical properties and ingredients of the material as presented for processing including for example temperature, viscosity if applicable, containment if any, surface area available for sensible heat transfer and moisture evaporation and starting moisture content.

the processing ambient air dry bulb and wet bulb temperatures and operating pressure throughout the manufacturing process.

(d) the relationship between the processing ambient air conditions noted in (c) and the product moisture content and surface temperature and surface vapour pressure throughout the production process.

(e) the processing potential for the induced formation of a product surface skin or preferably a light glazing to increase the surface permeability resistance to the transfer or product vapours and hence in one aspect assist in the control of puffing.

(f) the respective processing sub-system time/performance profiles and performance characteristics.

Typically the apparatus of the invention includes a surface temperature sensor (e.g. a fibre optic temperature sensing device or an infra red sensing device) to measure the surface temperature of the material.

The microwave electromagnetic heating frequencies typically used in the processes of the invention 896, 915, 922 and 2450 MHz ± permitted deviations which have been allocated by international agreement for this purpose. More typically the microwave frequency used is in the range 915±25 to 22.125±12.5 megacycles/second more typically 915±25 to 7,500±50 megacycles/second.

The preferred frequency is 2450 MHz having regard to the process requirements for product penetration, energy intensity capacity, operational control flexibility and high on-line production availability and maintenance.

According to a further aspect of the preferred embodiments of the present invention there is provided a means whereby a microwave energy heating system incorporated in the production process described in the second environment is used in whole or in part to control the product internal and surface temperature to a pre-determined processing temperature which may for example be controlled to the wet bulb temperature of the ambient air/vapour or held at the dry bulb temperature of the ambient air/vapour or at any pre-determined surface temperature above the ambient wet bulb temperature but preferably not higher than 100° C. and more preferably lower than 80° C. and most preferably lower than 60° C.

It should be appreciated that the invention has industrial applicability to a wide variety of food manufacturing processes where the preferred embodiments of the invention may be used in part or in whole or as independent processing sub-systems or as a combination of processes operating sequentially or simultaneously depending on the specific processing application.

In its preferred form for the production of cheese and cheese based products for example, there is provided in the starting material preparation stage fully controllable means for:

(a) receiving hot viscous cheese from a cheese processing cooker or other prior processing plant or storage facility at a temperature in the range 40° to 90° C. and preferably in the range 40° to 60° C.

(b) Receiving cold pieces or links of processed or other cheeses or cheese mixtures which have been pre-formed or sliced or diced or cut or pressed to a pre-determined size and shape and/or weight relative to the end product specification.

(c) The preparation of the starting material into its preferred form for subsequent processing and including for example such preparation processes as grinding, mixing, adding of condiments, emulsifiers, flavours, and other additives in standard proportions in accordance with the recipe of the particular product and blended for uniformity of the starting material for presentation for production processing.

(d) The controlled delivery and presentation for processing of the prepared starting material for example in extruded viscous cheese form as continuous strips or drops or other shapes or as cold links of processed cheese or other cheeses and cheese mixtures—all to predetermined size, shape and unit weight deposited onto a microwave transparent conveyor belt or other conveying system designed to suit the subsequent processing energy system and the characteristics of the product material and end product specifications and quality control.

(e) In its preferred form the starting material delivery and presentation sub-system described in (d) above there is provided a means for product heating and cooling to enable the temperature of the product to be automatically controlled to an adjustable pre-determined temperature of the product at the point of presentation for processing by the processes of the first and/or second embodiments.

According to a further aspect of the preferred embodiment of the present invention there is provided a means whereby the dry bulb and wet bulb temperatures of the recirculating ambient air/vapour moisture in the product processing chamber in the preferred form of the method of production described in the second environment is controllable relative to the surface temperature of the product being processed such that the drying process is engineered to operate as an adiabatic or isothermal process or at any pre-determined combined process between these two specific conditions.

The processes of the invention are suited to the manufacture of a wide range of food products and in particular snack food products and consumer shelf products and for the processing of agricultural products having similar processing requirements. Examples include snack food products including puffed snack food products and dried products from the following starting materials: All-natural cheeses and processed cheese (which may include other additives such as carbohydrates, cereals, proteins, meats, fruits, nuts, minerals, vegetables, colouring, flavouring, sodium and non-sodium emulsifiers, condiments, eggs, spices, and smallgoods, and other additives, may be included), including low fat cheeses and cheese based mixtures and including for example all cheddars, Colby, Swiss processed cheese, condiments, spices, marine algae, marine plants including seaweed, protein sources such as egg protein, soy protein, milk protein, gluten or caseinate which may optionally be emulsified with plant or animal fat or oils such as soybean, sunflower, peanut, olive, canola, safflower or palm oil, together with other components and water, cereals including wheat, rye, corn, rice, millet, sorghum, maize, barley and oats, nuts including peanuts, almonds, cashews, hazel nuts, maccadamia nuts, walnuts, flesh of prawns, shrimps, yabbies, Balmain bugs, pippies, flesh of turtles, flesh of tortoises, eels, octopus, squid, flesh of lobsters, flesh of crayfish, flesh of crabs, marine mammals and fish including hardiheads, white bait, mullet, sardines, salmon, tuna, trout, bream, black fish, flathead, tailer, John Dory, schnapper, trevally, sweep, shark, garfish, pike, leatherjacket, wrasse, mulloway, dolphin fish, kingfish, blennies, gobies, toad fish and other like fish, plant proteins and/or polypeptides from rice, barley, oat, rye, corn, wheat, animal meats and poultry including, beef, chicken, pork, rabbit and turkey, flowering plants such as rose, iris, carnation, daffodil, lily, vegetables such as cabbage, cauliflower, peas, beans, such as soyabeans, lentils, mung beans, lima beans, kidney beans, adzuki beans, and broad beans, broccoli, brussel sprouts, peanuts, chickpeas, asparagus, soya extracts, natural & processed dairy products, fruits including apples, bananas, apricots, plums, cherries, pears, pineapple, vine products including grapes and dates, fruit skins including orange and mandarin skins, and fruit seeds including grape seeds, berries, herbs & spices raw material, vegetable produce natural & semi-processed, oil seed, seeds, nodular and granular products, agricultural produce waste products: chemical compound recovery-citrus fruits, grape waste, paper pulp products, wood chips, wood shavings, sawdust, dehydration of chemical powder compounds, honey, treacle, sugar cane and molasses including sugar beet process molasses, for example.

The processes of the invention are capable of processing a wide range of starting materials which typically are cheese and cheese based mixed products which may vary in moisture content from 20–60% and in fat content from 15–55% in dry matter. The method of production is not limited to these typical analyses and would satisfactorily process starting materials having higher or lower moisture and fat contents than those indicated, the main variable in the process being the product residence time.

According to another aspect of the invention there is provided a range of snack food products manufactured from natural cheeses or processed cheeses or cheese based mixed ingredient starting materials and including for example such ingredients and additives as fruits, vegetables, cereals, berries, nuts, meats, eggs, smallgoods and herbs and spices to provide added flavour and/or nutritional value and variety of products when prepared by a process of the invention.

According to another aspect of the invention there is provided a range of manufactured wholesome cheese based snack food products characterised by their dry, crisp, crunchy, open cellular properties and high nutritional and energy value and palate appeal when prepared by a process of the invention.

By way of example only, these products include:

(a) A range of cheese based, dry, crisp, crunchy snack food products for example in the form of biscuits, crackers and wafers of various sizes, shapes and flavours, and of full cheese or mixed cheese and other ingredients content.

(b) A range of dry, crisp, crunchy snack food products for example in the form of snaps, curls, twists, crisps, balls, chips and sticks of various flavours and of full cheese or mixed cheese and other ingredients content.

(c) A range of light puffed or foamed snack food products in the form for example of cookies, cakes, puffs, buns and loaves of various flavours and of full cheese or more preferably mixed cheese and other ingredients content.

According to another aspect of the invention there is provided a range of long shelf life snack food products as described above for example and pre-processed and sterilised and packaged in microwaveable packaging ready for final home microwave heating for serving as hot savoury snack foods.

According to another aspect of the invention there is provided a range for example of stable long shelf life, dried, ground, packaged and sterilised cheese and cheese based mixed ingredients for use as flavouring and cooking additives, spiced cheese condiments and cheese fruit and cheese nut additives, fillings and spreads when prepared by a process of the invention.

According to another aspect of the invention there is provided a process of the invention in which the moisture content of the processed material is dried to a predetermined specification requirement which is determined for the particular product having regard to shelf life, stable physical condition and consumer appeal but typically being between 1.5% and 3.5%. The process is not limited to processing within this range and higher or lower moisture contents are provided.

Also provided is a process of production and a process suitable for the manufacture of vegetable and animal fat and protein based food products which exhibit similar processing requirements to that of the cheese based products covered by this invention

TABLE A

Examples of Types of Product Applications

| Product | Liquid | Viscous Extruded | Natural form | Sliced | Diced | Granular |
|---|---|---|---|---|---|---|
| Natural & processed cheeses and dairy products | ✓ | ✓ | ✓ | ✓ | ✓ | |
| Meats, fish, poultry | | | ✓ | ✓ | ✓ | |
| Fruits, berries, vine products | | | ✓ | ✓ | ✓ | |
| Herbs, condiments & spices raw material | | | ✓ | ✓ | | ✓ |
| Vegetable produce natural & semi-processed including marine algae and plant products | | ✓ | ✓ | ✓ | | ✓ |
| Cereal grains, oil seed, nuts, seeds, nodular and granular products | | | ✓ | ✓ | | ✓ |
| Agricultural produce waste products: chemical compound recovery-citrus fruits, grape waste etc. | ✓ | ✓ | ✓ | ✓ | ✓ | |
| Paper pulp products, wood chips, wood shavings, sawdust | | | | ✓ | | ✓ |
| Dehydration of chemical powder compounds | | | | ✓ | | ✓ |
| Sugar cane and sugar beet process molasses | | ✓ | | | | |

TABLE B

Expected Maximum Ranges of a Number of Process Parameters

| Product Designation# | T(0)* | T(1)* | T(2)* | T(3)* | H(1)* | H(2)* | H(3)* | P(1)* | P(2)* | P(3)* |
|---|---|---|---|---|---|---|---|---|---|---|
| A | Max expected range 0–90° C. | Max expected range 2–60° C. | Max expected range 10–80° C. | Max expected range 15–120° C. | Typically atmospheric humidity 10–90% humidity | Max expected range 1–90% humidity | Max expected range 5–30% humidity | Max expected range 0.5–1 atm., Typically 1 atm | Max expected range 1 atm to −0.9 | Max expected range 1 atm to −0.1 |
| B | Max expected range 5–30° C. | Max expected range 4–30° C. | Max expected range 10–25° C. | Max expected range 20–50° C. | Typically atmospheric humidity 10–90% humidity | Max expected range 1–90% humidity | Max expected range 5–30% humidity | Max expected range 0.5–1 atm., Typically 1 atm | Max expected range 1 atm to −0.9 | Max expected range 1 atm to −0.1 |
| C | Max expected range 4–30° C. | Max expected range 4–30° C. | Max expected range 15–50° C. | Max expected range 15–70° C. | Typically atmospheric humidity 10–90% humidity | Max expected range 10–90% humidity | Max expected range 2–30% humidity | Max expected range 0.5–1 atm., Typically 1 atm | Max expected range 1 atm to −0.9 | Max expected range 1 atm to −0.1 |
| D | Max expected range 5–40° C. | Max expected range 5–60° C. | Max expected range 15–80° C. | Max expected range 15–100° C. | Typically atmospheric humidity 10–90% humidity | Max expected range 5–90% humidity | Max expected range 2–30% humidity | Max expected range 0.5–1 atm., Typically 1 atm | Max expected range 1 atm to −0.9 | Max expected range 1 atm to −0.1 |

TABLE B-continued

Expected Maximum Ranges of a Number of Process Parameters

| Product Designation# | T(0)* | T(1)* | T(2)* | T(3)* | H(1)* | H(2)* | H(3)* | P(1)* | P(2)* | P(3)* |
|---|---|---|---|---|---|---|---|---|---|---|
| E | Max expected range 5–40° C. | Max expected range 5–40° C. | Max expected range 15–80° C. | Max expected range 15–100° C. | Typically atmospheric humidity 10–90% humidity | Max expected range 5–90% humidity | Max expected range 2–30% humidity | Max expected range 0.5–1 atm., Typically 1 atm | Max expected range 1 atm to −0.9 | Max expected range 1 atm to −0.1 |
| F | Max expected range 4–45° C. | Max expected range 5–45° C. | Max expected range 5–90° C. | Max expected range 10–120° C. | Typically atmospheric humidity 10–90% humidity | Max expected range 5–90% humidity | Max expected range 2–30% humidity | Max expected range 0.5–1 atm., Typically 1 atm | Max expected range 1 atm to −0.9 | Max expected range 1 atm to −0.1 |
| G | Max expected range 0–90° C. | Max expected range 5–70° C. | Max expected range 5–80° C. | Max expected range 10–150° C. | Typically atmospheric humidity 10–90% humidity | Max expected range 5–90% humidity | Max expected range 2–30% humidity | Max expected range 0.5–1 atm., Typically 1 atm | Max expected range 1 atm to −0.9 | Max expected range 1 atm to −0.1 |
| H | Max expected range 0–90° C. | Max expected range 4–90° C. | Max expected range 10–90° C. | Max expected range 15–120° C. | Typically atmospheric humidity 10–90% humidity | Max expected range 10–90% humidity | Max expected range 2–30% humidity | Max expected range 0.5–1 atm., Typically 1 atm | Max expected range 1 atm to −0.9 | Max expected range 1 atm to −0.1 |
| I | Max expected range 0–95° C. | Max expected range 4–90° C. | Max expected range 10–90° C. | Max expected range 10–120° C. | Typically atmospheric humidity 10–90% humidity | Max expected range 10–90% humidity | Max expected range 2–30% humidity | Max expected range 0.5–1 atm., Typically 1 atm | Max expected range 1 atm to −0.9 | Max expected range 1 atm to −0.1 |
| J | Max expected range 5–40° C. | Max expected range 10–60° C. | Max expected range 15–95° C. | Max expected range 25–120° C. | Typically atmospheric humidity 10–90% humidity | Max expected range 10–90% humidity | Max expected range 2–30% humidity | Max expected range 0.5–1 atm., Typically 1 atm | Max expected range 1 atm to −0.9 | Max expected range 1 atm to −0.1 |

For the list of Products corresponding to the Product Designation refer to column 2 of Table C.

TABLE C

Expected Maximum Ranges of a Number of Process Parameters

| Product Designation | Product | T(2)[1]*+ | T(3)[1]*+ |
|---|---|---|---|
| A | Natural & processed cheeses and dairy products | Max expected temperature of bulk material during processing - 90° C. | Max expected temperture of bulk material during processing - 120° C. |
| B | Meats, fish, poultry (natural & processed) | Max expected temperature of bulk material during processing - 60° C. | Max expected temperture of bulk material during processing - 110° C. |
| C | Fruits, berries, vine products (natural & processed) | Max expected temperature of bulk material during processing - 60° C. | Max expected temperture of bulk material during processing - 120° C. |
| D | Herbs, condiments & spices raw material | Max expected temperature of bulk material during processing - 100° C. | Max expected temperture of bulk material during processing - 120° C. |
| E | Vegetable produced natural & semi-processed including marine algae and plant products | Max expected temperature of bulk material during processing - 60° C. | Max expected temperture of bulk material during processing - 110° C. |
| F | Cereal grains, oil seed, nuts, seeds, nodular and granular products | Max expected temperature of bulk material during processing - 60° C. | Max expected temperture of bulk material during processing - 120° C. |
| G | Agricultural produce waste products: chemical compound recovery- citrus fruits, grape waste etc. | Max expected temperature of bulk material during processing - 90° C. | Max expected temperture of bulk material during processing - 150° C. |
| H | Paper pulp products, wood chips, wood shavings, sawdust | Max expected temperature of bulk material during processing - 90° C. | Max expected temperture of bulk material during processing - 150° C. |
| I | Dehydration of chemical powder compounds | Max expected temperature of bulk material during processing - 90° C. | Max expected temperture of bulk material during processing - 150° C. |
| J | Sugar cane and sugar beet process molasses | Max expected temperature of bulk material during processing - 90° C. | Max expected temperture of bulk material during processing - 130° C. |

+Minimum temperature of bulk material during processing is typically 5° C.
*Processing Parameters - Definitions (see Tables B and C for parameter enteries):

Step 1:
T(0)—Bulk material temperature at entry to Step 1
T(1)—Bulk material temperature at exit from Step 1
H(1)—Processing environment RH %
P(1)—Processing environment atmospheric pressure
Step 2:
H(2)—Processing environment RH %
P(2)—Processing environment atmospheric pressure
T(2)—Processing environment DB temperature
T(2)$^1$—Bulk material temperature
T(2)$^2$—Surface temperature of material
Step 3:
T(3)—Processing environment DB temperature
T(3)$^1$—Bulk material temperature
T(3)$^2$—Surface temperature of material
H(3)—Processing environment RH %
P(3)—Processing equipment atmospheric pressure
WBD(3)—Processing environment DB temperature minus the processing environment WB temperature.
Note:
DB=dry bulb temperature
WB=wet bulb temperature
RH %=relative humidity percentage
Temperature=in degrees celsius
Pressure=in relation to one (1) atmosphere.

T(0), T(1), T(2), and T(3) have expected maximum temperature ranges as listed in Table B, and T(2)$^1$, and T(3)$^1$ have expected maximum temperature ranges as listed in Table C. Preferred temperatures or temperature ranges within these expected maximum temperature ranges for each of these parameters are listed in Table D. Thus to choose a particularly preferred temperature range e° C.–f° C. for a particular T, e is selected from the group consisting of a value presented in the column headed "e" in Table D below at on or more of entries 1–25 (where e≧the minimum temperature listed in Table B for the particular T), and f is selected from the group of the values presented in the column headed "f" adjacent the corresponding "e" entry (where f<the maximum temperature listed in Table B for the particular T).

TABLE D

Temperature ranges of Parameters T(0), T(1), T(2), T(3), T(2)$^1$, T(3)$^1$

| Entry | e | f |
|---|---|---|
| 1 | 0 | 5, 10, 15, 20, 25, 30, 35, 40, 45, 50, 55, 60, 65, 70, 75, 80, 85, 90, 95, 100, 110, 120, 130, 140, 150 |
| 2 | 5 | 10, 15, 20, 25, 30, 35, 40, 45, 50, 55, 60, 65, 70, 75, 80, 85, 90, 95, 100, 110, 120, 130, 140, 150 |
| 3 | 10 | 15, 20, 25, 30, 35, 40, 45, 50, 55, 60, 65, 70, 75, 80, 85, 90, 95, 100, 110, 120, 130, 140, 150 |
| 4 | 15 | 20, 25, 30, 35, 40, 45, 50, 55, 60, 65, 70, 75, 80, 85, 90, 95, 100, 110, 120, 130, 140, 150 |
| 5 | 20 | 25, 30, 35, 40, 45, 50, 55, 60, 65, 70, 75, 80, 85, 90, 95, 100, 110, 120, 130, 140, 150 |
| 6 | 25 | 30, 35, 40, 45, 50, 55, 60, 65, 70, 75, 80, 85, 90, 95, 100, 110, 120, 130, 140, 150 |
| 7 | 30 | 35, 40, 45, 50, 55, 60, 65, 70, 75, 80, 85, 90, 95, 100, 110, 120, 130, 140, 150 |
| 8 | 35 | 40, 45, 50, 55, 60, 65, 70, 75, 80, 85, 90, 95, 100, 110, 120, 130, 140, 150 |
| 9 | 40 | 45, 50, 55, 60, 65, 70, 75, 80, 85, 90, 95, 100, 110, 120, 130, 140, 150 |
| 10 | 45 | 50, 55, 60, 65, 70, 75, 80, 85, 90, 95, 100, 110, 120, 130, 140, 150 |
| 11 | 50 | 55, 60, 65, 70, 75, 80, 85, 90, 95, 100, 110, 120, 130, 140, 150 |
| 12 | 55 | 60, 65, 70, 75, 80, 85, 90, 95, 100, 110, 120, 130, 140, 150 |
| 13 | 60 | 65, 70, 75, 80, 85, 90, 95, 100, 110, 120, 130, 140, 150 |
| 14 | 65 | 70, 75, 80, 85, 90, 95, 100, 110, 120, 130, 140, 150 |
| 15 | 70 | 75, 80, 85, 90, 95, 100, 110, 120, 130, 140, 150 |
| 16 | 75 | 80, 85, 90, 95, 100, 110, 120, 130, 140, 150 |
| 17 | 80 | 85, 90, 95, 100, 110, 120, 130, 140, 150 |
| 18 | 85 | 90, 95, 100, 110, 120, 130, 140, 150 |
| 19 | 90 | 95, 100, 110, 120, 130, 140, 150 |
| 20 | 95 | 100, 110, 120, 130, 140, 150 |
| 21 | 100 | 110, 120, 130, 140, 150 |
| 22 | 110 | 120, 130, 140, 150 |
| 23 | 120 | 130, 140, 150 |
| 24 | 130 | 140, 150 |
| 25 | 140 | 150 |

H(1), H(2), and H(3) have expected maximum humidity ranges as listed in Table B. Preferred humidities or humidity ranges within these expected maximum humidity ranges for each of these parameters are listed in Table E. Thus to choose a particularly preferred humidity range g %–h % for a particular H. g is selected from the group consisting of a value presented in the column headed "g" in Table E below at one or more of entries 1–18 (where g>the minimum humidity listed in Table B for the particular H, and h is selected from the group of the values presented in the column headed "h" adjacent the corresponding "g" entry (where h<the maximum humidity listed in Table B for the particular H).

TABLE E

% Humidity ranges of Parameters H(1), H(2), H(3)

| Entry | g | h |
|---|---|---|
| 1 | 1 | 5, 10, 15, 20, 25, 30, 35, 40, 45, 50, 55, 60, 65, 70, 75, 80, 85, 90 |
| 2 | 5 | 10, 15, 20, 25, 30, 35, 40, 45, 50, 55, 60, 65, 70, 75, 80, 85, 90 |
| 3 | 10 | 15, 20, 25, 30, 35, 40, 45, 50, 55, 60, 65, 70, 75 80, 85, 90 |
| 4 | 15 | 20, 25, 30, 35, 40, 45, 50, 55, 60, 65, 70, 75, 80 85, 90 |
| 5 | 20 | 25, 30, 35, 40, 45, 50, 55, 60, 65, 70, 75, 80, 85, 90 |
| 6 | 25 | 30, 35, 40, 45, 50, 55, 60, 65, 70, 75, 80, 85, 90 |
| 7 | 30 | 35, 40, 45, 50, 55, 60, 65, 70, 75, 80, 85, 90 |
| 8 | 35 | 40, 45, 50, 55, 60, 65, 70, 75, 80, 85 90 |
| 9 | 40 | 45, 50, 55, 60, 65, 70, 75, 80, 85, 90 |
| 10 | 45 | 50, 55, 60, 65, 70, 75, 80, 85, 90 |
| 11 | 50 | 55, 60, 65, 70, 75, 80, 85, 90, 95, 100, 110, 120, 130, 140, 150 |
| 12 | 55 | 60, 65, 70, 75, 80, 85, 90 |
| 13 | 60 | 65, 70, 75, 80, 85, 90 |
| 14 | 65 | 70, 75, 80, 85, 90 |
| 15 | 70 | 75, 80, 85, 90 |
| 16 | 75 | 80, 85, 90 |
| 17 | 80 | 85, 90 |
| 18 | 85 | 90 |

P(1), P(2), and P(3) have expected maximum pressure ranges as listed in Table B. Preferred pressures or pressure ranges within these expected maximum pressure ranges for each of these parameters are listed in Table F. Thus to choose a particularly preferred pressure range i atm–j atm for a particular P, i is selected from the group consisting of a value presented in the column headed "i" in Table F below at one or more of entries 1–27 (where i≧the minimum humidity listed in Table B for the particular P), and j is selected from the group of the values presented in the column headed "j" adjacent the corresponding "i" entry (where j<the maximum humidity listed in Table B for the particular P).

TABLE F

Atm ranges of Parameters P(1), P(2), P(3)

| Entry | i | j |
|---|---|---|
| 1 | 0.1 | 0.15, 0.20, 0.25, 0.30, 0.35, 0.40, 0.45, 0.50, 0.55, 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 2 | 0.15 | 0.20, 0.25, 0.30, 0.35, 0.40, 0.45, 0.50, 0.55, 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 3 | 0.20 | 0.25, 0.30, 0.35, 0.40, 0.45, 0.50, 0.55, 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 4 | 0.25 | 0.30, 0.35, 0.40, 0.45, 0.50, 0.55, 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 5 | 0.3 | 0.35, 0.40, 0.45, 0.50, 0.55, 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 6 | 0.35 | 0.40, 0.45, 0.50, 0.55, 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 7 | 0.4 | 0.45, 0.50, 0.55, 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 8 | 0.45 | 0.50, 0.55, 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 9 | 0.5 | 0.55, 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 10 | 0.55 | 0.60, 0.65, 0.70, 0.75, 0.80, 0.85, 0.875, 0.90, 0.91, 0.92, 0.93, 0.94, 0.95, 0.96, 0.97, 0.98, 0.99, 1 |
| 11 | 0.6 | 0.65, 0.70, 0.75, 0.80, 0.85, 0.875, 0.90, 0.91, 0.92, 0.93, 0.94, 0.95, 0.96, 0.97, 0.98, 0.99, 1 |
| 12 | 0.65 | 0.70, 0.75, 0.80, 0.85, 0.875, 0.90, 0.91, 0.92, 0.93, 0.94, 0.95, 0.96, 0.97, 0.98, 0.99, 1 |
| 13 | 0.7 | 0.75, 0.80, 0.85, 0.875, 0.90, 0.91, 0.92, 0.93, 0.94, 0.95, 0.96, 0.97, 0.98, 0.99, 1 |
| 14 | 0.75 | 0.80, 0.85, 0.875, 0.90, 0.91, 0.92, 0.93, 0.94, 0.95, 0.96, 0.97, 0.98, 0.99, 1 |
| 15 | 0.8 | 0.85, 0.875, 0.90, 0.91, 0.92, 0.93, 0.94, 0.95, 0.96, 0.97, 0.98, 0.99, 1 |
| 16 | 0.85 | 0.875, 0.90, 0.91, 0.92, 0.93, 0.94, 0.95, 0.96, 0.97, 0.98, 0.99, 1 |
| 17 | 0.875 | 0.90, 0.91, 0.92, 0.93, 0.94, 0.95, 0.96, 0.97, 0.98, 0.99, 1 |
| 18 | 0.9 | 0.91, 0.92, 0.93, 0.94, 0.95, 0.96, 0.97, 0.98, 0.99, 1 |
| 19 | 0.91 | 0.92, 0.93, 0.94, 0.95, 0.96, 0.97, 0.98, 0.99, 1 |
| 20 | 0.92 | 0.93, 0.94, 0.95, 0.96, 0.97, 0.98, 0.99, 1 |
| 21 | 0.93 | 0.94, 0.95, 0.96, 0.97, 0.98, 0.99, 1 |
| 22 | 0.94 | 0.95, 0.96, 0.97, 0.98, 0.99, 1 |
| 23 | 0.95 | 0.96, 0.97, 0.98, 0.99, 1 |
| 24 | 0.96 | 0.97, 0.98, 0.99, 1 |
| 25 | 0.97 | 0.98, 0.99, 1 |
| 26 | 0.98 | 0.99, 1 |
| 27 | 0.99 | 1 |

The present invention contemplates amongst other things methods and processes for the processing of cheese and the production of cheese and cheese based snack foods and home microwaveable snack food products and cheese and cheese based stable long shelf life consumer products, and processes method and application of electromagnetic wave energy for food product processing including for example processes known as tempering, heating, glazing, puffing, cooking, browning, leavening, drying, vaporising, pasteurising and sterilising and using for example microwave (MW) and radio frequency (RF) energy and infra-red (IR) radiant energy.

The processes of present invention may be adapted to a method of production suitable for industrial commercial application for the production of the products either on a batch process basis and most preferably on a continuous flow production basis.

The invention includes within its scope a method of production in which the various processes involved in the overall production process are carried out in predetermined and programmable sequential steps either singly or in combination of more than one process proceeding concurrently and simultaneously and being at all times under the automatic control of a feedback control system which responds continuously to the condition of the product throughout the course of the overall production process.

The processes of the second and third embodiments may be adapted whereby the commonly known and observed product changes which occur during product processing including for example the phenomena of leavening, puffing, glazing, skin effects, drying, browning, edge burning, stripping and volatilising are pre-determined and quantified and controlled for each step or stage of the overall production process such as to enable a person reasonably skilled in the art to repeat the method and process for the continuous production of the product to a high standard of physical uniformity and product quality.

The processes of the first to third embodiments may be adapted in many instances to operate at temperatures sufficiently low to eliminate or minimise the damage otherwise caused to the physical properties of the product during processing and to reduce to a low value or to a minimum the volatilisation of aromatic substances and oils contained in the product.

The processes of the first and third embodiments may in many instances be adapted to substantially reduce, or minimise or eliminate product spoiling changes which typically occur in the product physical form and cellular structure and surface condition during processing using conventional technologies, including for example, the phenomena of product surface changes, formation of hardened surface and skins, loss of colour, loss of flavour, glazing, browning, edge burning, chewiness, non-uniform processing, excessive drying and product exploding.

The processes of the first and third embodiments may in many instances be adapted to provide relatively short product residence times and hence increases production throughput and energy efficiency.

The meaning of "spoil" throughout the specification and claims is to be taken as meaning that a material that is spoilt is no longer suitable for its intended use because it has been spoilt. For example the undesirably altered appearance of processed material, tough skins on processed material, lack of nutritional value of processed material, chewy texture of processed material or bland taste devoid of any significant distinguishing flavour or taste of processed material may, depending on the intended use, constitute spoilt processed material

BEST MODE AND OTHER MODES FOR PERFORMING INVENTION

Figure 1:
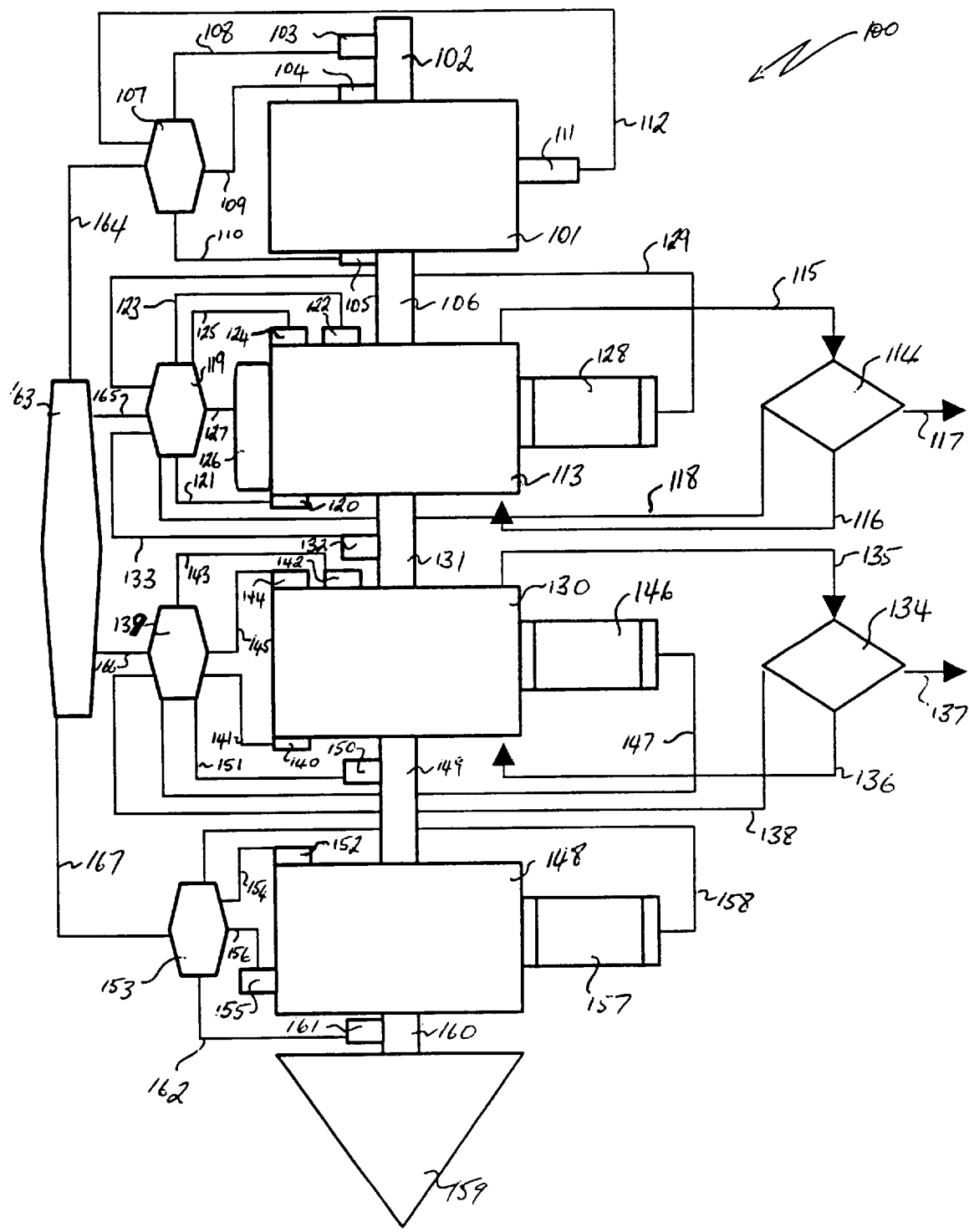
FIG. 1 is a block diagram depicting a preferred system of the invention.

Referring to FIG. 1 a system 100 for removing water from a material is depicted. System 100 includes apparatus 101 which prepares a starting material to be processed into a suitable form for processing. The type of machine/mechanism/device/appliance employed for apparatus 101 depends on the nature of the starting material and the characteristics required of the processed product from the starting material. The starting material inputted into apparatus 100 may be solid, liquid or viscous form, for example. Typically apparatus 100 receives pieces or links of material which have been pre-formed or sliced or diced or cut or pressed to a pre-determined size and shape and/or weight relative to the end product specification. The preparation of the starting material into its preferred form for subsequent processing includes for example such preparation processes as grinding, mixing, adding of condiments, emulsifiers, flavours, and other additives typically in standard proportions in accordance with the recipe of the particular product and blended for uniformity of the starting material for presentation for production processing. Apparatus 101 is primarily concerned with the controlled delivery and presentation for processing of the prepared starting material at the appropriate temperature, in the appropriate form, for example in extruded viscous form as continuous strips or drops or other shapes or as cold links of starting material—all to predetermined size, shape and unit weight designed to suit the subsequent processing energy system and the characteristics of the product material and end product specifications and quality control. For example, apparatus 101 could include: (i) a steam kettle which heats the starting material changing it into a viscous form and then drops predetermined amounts onto a conveyor system for subsequent processing; (ii) a dicing machine that dices the starting material and places the diced material in solid form onto a conveyor system; (iii) a slicing machine that slices the starting material and places the sliced material in solid form onto a conveyer system; (iv) a de-seeding or de-stoning machine optionally in combination with (ii) or (iii); (v) an extruder which deposits discreet predetermined amounts of viscous staring material in a particular shape or into containers on a conveyer system; (vi) a hopper; or (vii) an auger/pump which deposits granular/ground/slurry/viscous materials onto a conveyer system. Starting material is fed into apparatus 101 via input conveyer system 102, the delivery capacity of which is governed by variable speed conveyer drive 103 which is connected to material presentation processor 107 via line 108. The temperature of the starting material passing into apparatus 101 is measured by temperature sensing device 104, which is coupled to processor 107 via line 109, and the temperature of the material leaving apparatus 101 via output conveyer system 106 is measured by temperature sensing device 105, which is coupled to processor 107 via line 110. Heater/cooler 111 is coupled to processor 107 via line 112.

At least a partial barrier to moisture vapour transfer through the surface of the material is provided during processing in processing chamber 113, in which material inputted therein via conveyer system 106, is subjected to a controlled temperature and humidity environment which is maintained by heat pump 114 which is coupled to chamber 113 by lines 115 and 116. Heat pump 114 includes vapour exhaust 117 and is coupled to control processor 119 by line 118. Temperature sensor 120, which is coupled to chamber 113, is coupled to processor 119 via line 121. Pressure sensor 122, which is coupled to chamber 113, is coupled to processor 119 via line 123. Humidity sensor 124, which is coupled to chamber 113, is coupled to processor 119 via line 125. During processing, the environment in chamber 113 is maintained at a temperature, typically a predetermined temperature or range of temperatures, which is/are less than that which would spoil the material, and, in which the partial vapour pressure of water of said environment is below saturation whereby the material is not spoilt by burning or substantial cooking, for example, during simultaneous irradiation of the material in the environment with infra red radiation and microwave irradiation, which spoils the material. Infra red radiant heaters 126, which are coupled to chamber 113, are coupled to processor 119 via line 127. Microwave generators 128, which are coupled to chamber 113, are coupled to processor 119 via line 129. Infra red radiant heaters 126 an microwave generators 128 may be used to simultaneously or sequentially irradiate the material in chamber 113 with infra red radiation and microwave irradiation, the amount of infra red radiation being sufficient to at least partially seal the surface of the material to provide at least a partial barrier to moisture vapour transfer through the surface of the material without spoiling the material by, for example, burning or substantially cooking the material, or forming a surface barrier which spoils the material, and said amount of microwave irradiation being sufficient to cause a slight positive vapour pressure within the material to prevent the material from deflating, wherein the amount of said microwave irradiation is not sufficient to spoil the material by, for example, substantially removing moisture from the material, burning or substantially cooking or causing surface damage which spoils the material. During processing in chamber 113 the following parameters of the environment therein are simultaneously maintained (i) the temperature of the environment, and, (ii) the partial vapour pressure of water of the environment below saturation, whereby the material is not spoilt, during simultaneous irradiation of the material in the environment with infra red radiation and microwave irradiation. Typically, the pressure is also controlled during processing in chamber 113.

Material from chamber 113 is transported to processing chamber 130 via conveyer system 131 which is driven by variable speed drive 132 which in turn is coupled to processor 119 via line 133. During processing the material in chamber 130 is subjected to a controlled temperature, pressure and humidity environment, which are maintained by heat pump 134 which is coupled to chamber 130 by line 135 and 136. During processing moisture is removed from the material in chamber 130. Heat pump 134 includes vapour exhaust 137 and is coupled to control processor 139 by line 138. Temperature sensor 140, which is coupled to chamber 130, is coupled to processor 139 via line 141. Pressure sensor 142, which is coupled to chamber 130, is coupled to processor 139 via line 143. Humidity sensor 144, which is coupled to chamber 130, is coupled to processor 139 via line 145. Microwave generators 146, which are coupled to chamber 130, are coupled to processor 139 via line 147. During processing microwave generators 146 irradiate the material chamber 130 with an amount of microwave irradiation effective to increase the moisture at the surface of the irradiated material whereby the vapour pressure at the surface is greater than the vapour pressure of the environment whereby moisture is transferred from the surface to the environment, wherein the amount of said microwave irradiation is not sufficient to spoil the material by, for example, burning, overcooking or causing surface damage. During processing in chamber 130 the following parameters of the environment therein are simultaneously maintained: (i) the temperature of the environment, and, (ii) the partial vapour pressure of water of the environment below saturation, whereby the material is not spoilt during irradiation of the material in the environment with microwave irradiation. During processing in chamber 130 the amount of microwave irradiation is sufficient to substantially maintain said vapour pressure at the surface, until a required amount of moisture has been removed from said material, without reducing the surface temperature of the material more than 50% of the web bulb depression of the environment.

Processed material from chamber 130 is transported to sterilising/finishing chamber 148 via conveyer system 149 which is driven by variable speed drive 150 which in turn is coupled to processor 139 via line 151. Temperature sensor 152, which is coupled to chamber 148, is coupled to processor 153 via line 154. Cooler 155 which is coupled to chamber 148, is coupled to processor 153 via line 156. Microwave generators 157, which are coupled to chamber 148, are coupled to processor 153 via line 158. During processing microwave generators 157 irradiate the material in chamber 148 with an amount of microwave irradiation effective to sterilise the processed material from chamber 130. The sterilised product is transported from chamber 148 to storage container 159 via conveyer system 160 which is driven by variable speed conveyer drive 161 which, in turn, is coupled to processor 153 via line 162.

Processors 107, 119, 139 and 153 are coupled to integrated systems control processor 163, via lines 164, 165, 166 and 167 respectively.

In use, starting material is transported at an appropriate rate into apparatus 101 via conveyer system 102 which prepares the starting material into a suitable form for processing. The appropriate rate of conveyer system 102 which is determined by the downstream processing rate in chambers 113, 130 and 148 is governed by variable speed conveyer drive 103 the speed of which is controlled by a signal from processor 107 via line 109, processor 107 being controlled by processor 163 via line 164. The temperature of the starting material passing into apparatus 101 and leaving apparatus 101 is measured by temperature sensing devices 104 and 105, which send signals to processor 107 via lines 109 and 110 respectively, which in turns sends signals to heater/cooler 111 via line 112 to adjust the temperature of the material in apparatus 101 whereby the material leaving apparatus 101 is at a predetermined temperature.

At least a partial barrier to moisture vapour transfer through the surface of the material is provided during processing in processing chamber 113. Material at a predetermined temperature from apparatus 101 is inputted into chamber 113 by conveyer system 106. The controlled temperature and humidity environment in chamber 106 is maintained, during processing, by heat pump 114 which is controlled by processor 119, via line 118, (which in turn is controlled by processor 163 via line 165), which receives signals from temperature sensor 120, via line 121, pressure sensor 122, via line 123, humidity sensor 124, via line 125, at a temperature, typically a predetermined temperature or range of temperatures, which is/are less than that which would spoil the material, and, in which the partial vapour pressure of water of said environments is below saturation whereby the material is not spoilt during irradiation of the material in the environment with microwave irradiation. During processing infra red radiant heaters 126 and microwave generators 128 are controlled by processor 119 via lines 127 and 129 (which in turn is controlled by processor 163 via line 165) simultaneously or sequentially irradiate the material in chamber 113 with infra red radiation and microwave irradiation, the amount of infra red radiation being sufficient to at least partially seal the surface of the material to provide at least a partial barrier to moisture vapour transfer through the surface of the material (i.e. surface condition the material for later processing such as puffing, for example) without spoiling the material, such as, for example, by burning or cooking the material, or damaging the surface of the material, and said amount of microwave irradiation being sufficient to cause a slight positive vapour pressure within the material to prevent the material from deflating, wherein the amount of said microwave irradiation is not sufficient to spoil the material, such as, for example, by burning or substantially cooking the material, or damaging the surface of the material. During processing in chamber 113 the following parameters of the environment, and, (ii) the partial vapour pressure of water of the environment below saturation, whereby the material is not spoilt during processing. Typically, the pressure is also controlled during processing in chamber 113 typically slightly less than atmospheric to avoid vapour emissions from chamber 113.

After processing in chamber 113 material therefrom is transported at a controlled rate to processing chamber 130 via conveyer system 131 which is driven by variable speed drive 132 which in turn is controlled by processor 139 via line 133 (which in turn is controlled by processor 163 via line 166). The controlled temperature, pressure and humidity environment in chamber 130 is maintained, during processing, by heat pump 134 which in turn is controlled by processor 139 via line 138 (which in turn is controlled by processor 163 via line 166), which receives signals from temperature sensor 140, via line 141, pressure sensor 142, via line 143, humidity sensor 144, via line 145. During processing moisture is removed from the material in chamber 130. Microwave generators 146, which are which are controlled by processor 139 via line 147 (which in turn is controlled by processor 163 via line 166), irradiate the material in chamber 130 with an amount of microwave irradiation effective to increase the moisture at the surface of the irradiated material whereby the vapour pressure at the surface is greater than the vapour pressure of the environment whereby moisture is transferred from the surface of the environment wherein the amount of said microwave irradiation is not sufficient to spoil the material by for example, burning, overcooking or causing surface damage. During processing in chamber 130 the following parameters of the environment therein are simultaneously maintained: (i) the temperature of the environment, and, (ii) the partial vapour pressure of water of the environment below saturation whereby the material is not spoilt during irradiation of the material in the environment with microwave irradiation. During processing in chamber 130 the amount of microwave irradiation is sufficient to substantially maintain said vapour pressure at the surface, until a required amount of moisture has been removed from said material, without reducing the surface temperature of the material more than 50% of the wet bulb depression of the environment.

Processed material from chamber 130 is transported to sterilising/finishing chamber 148 via conveyer system 149 which is driven by variable speed drive 150 which in turn is controlled by processor 139 via line 151 (which in turn is controlled by processor 163 via line 167). The temperature in chamber 148 which is sensed by temperature sensor 152 and which sends a signal to processor 153 via line 154, is typically determined by cooler 155 which is controlled by processor 153 via line 156 and microwave generators 157, which are controlled by processor 153 via line 158 (which in turn is controlled by processor 163 via line 167). During processing microwave generators 157 irradiate the material in chamber 148 with an amount of microwave irradiation effective to sterilise the processed material from chamber 130. The sterilised product which may be packaged in chamber 148 is transported from chamber 148 to storage container 159 via conveyer system 160 which is driven by variable speed conveyer drive 161 which, in turn, is coupled to processor 153 via line 162 (which in turn is controlled by processor 163 via line 167).

As will be apparent from the above description the overriding control, coordination and integration of processors 107, 119, 139 and 153 are determined by integrated systems control processor 163, via lines 164, 165, 166 and 167 respectively.

Figure 2:
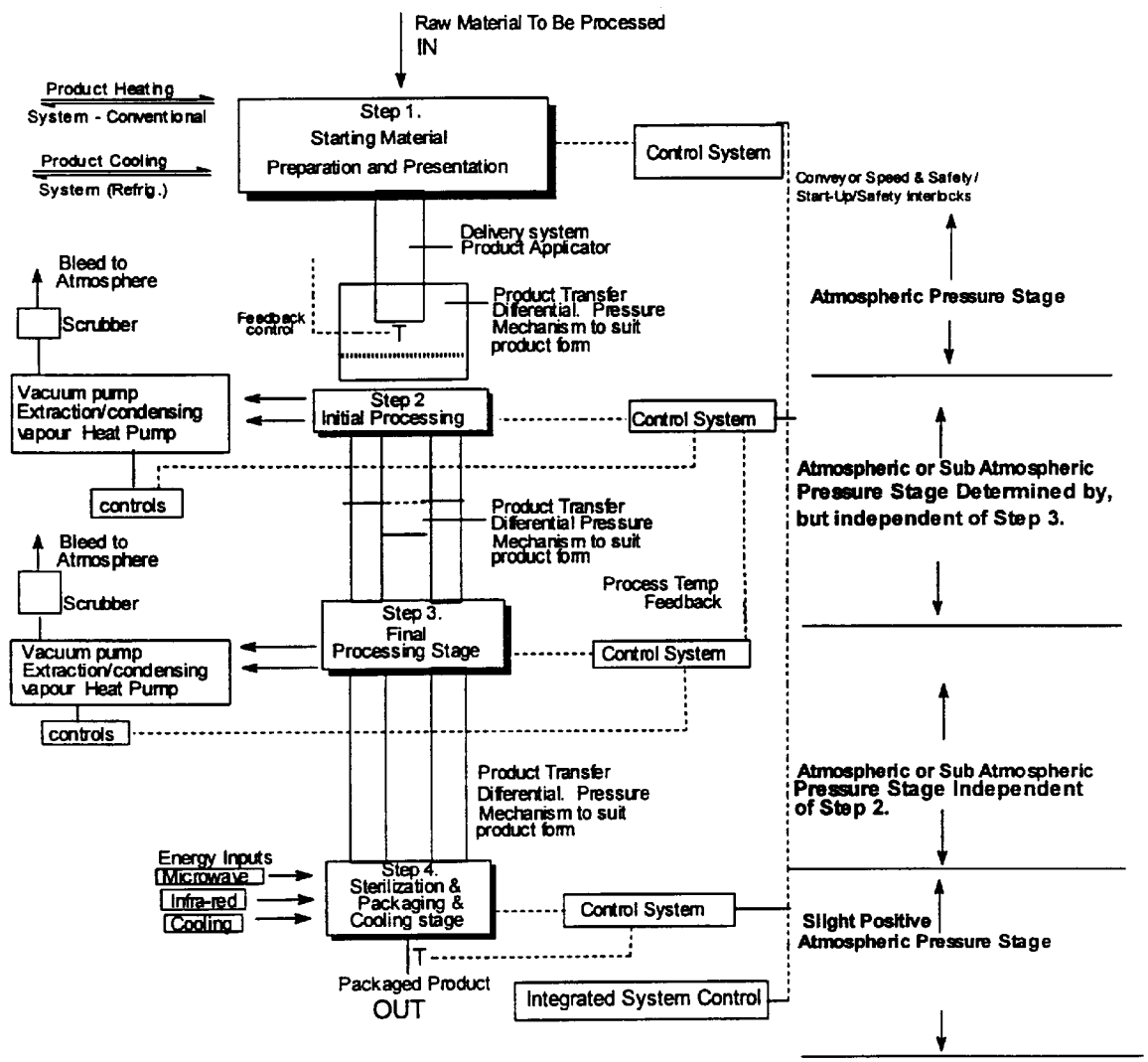
FIG. 2 is a Process Block Diagram of the present invention.

The processing system typically comprises four (4) distinct steps as described above with reference to FIG. 1 and as is illustrated in FIG. 2. These steps include:

Step 1. (Material Pre-Processing)

Figure 3:
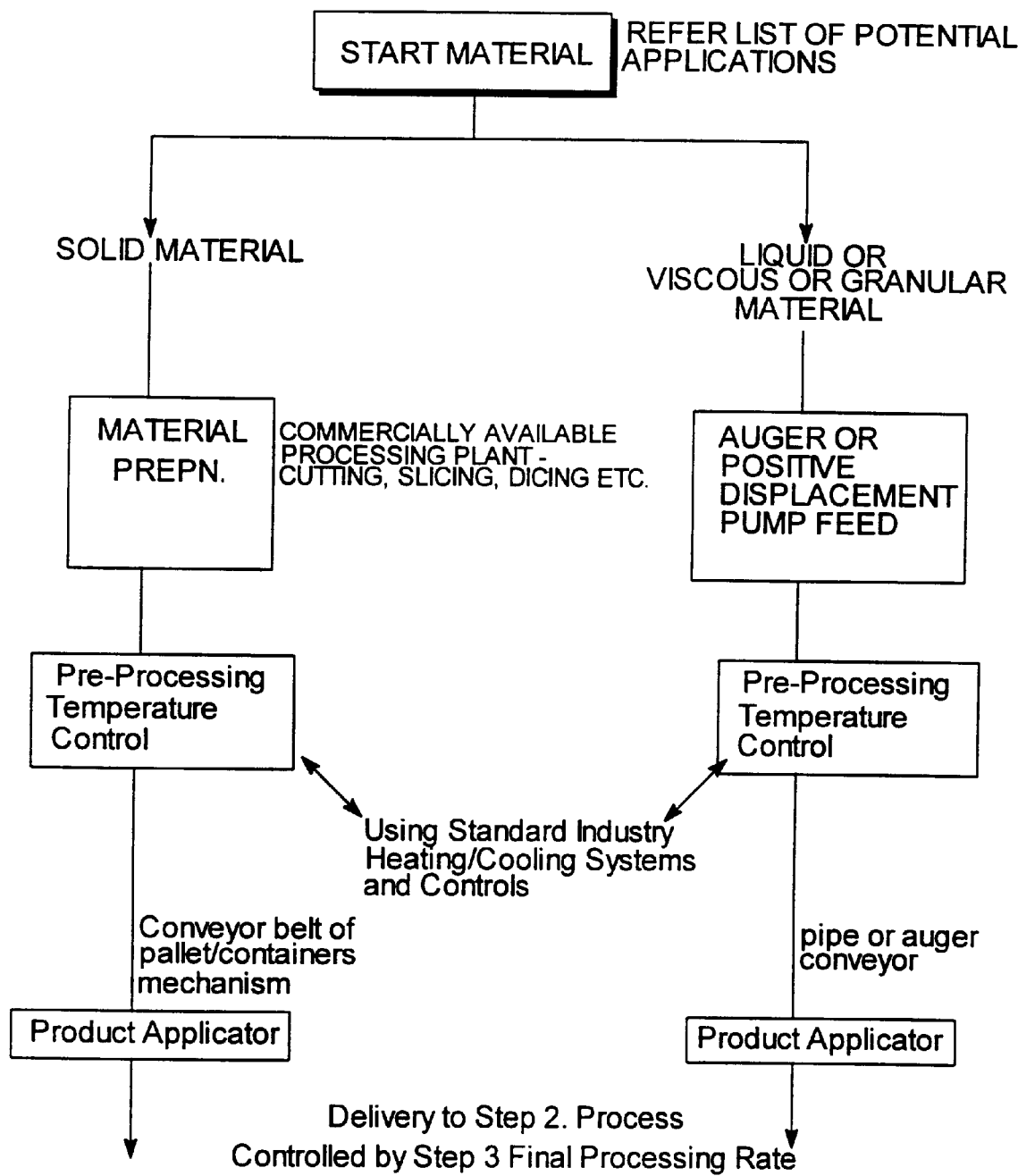
FIG. 3 shows Process Step 1 of the Process Block Diagram of FIG. 2.

This step is as described above, and as shown in FIGS. 2 and 3, receives the starting material in natural or pre-processed form over a wide range of material temperatures and converts the material into a physical form suitable for processing and delivery of the material at a pre-determined temperature to the initial processing Step 2.

The Step 1 process typically utilises standard industry product preparing machinery and standard industry heating and cooling systems and control equipment for this process. The end physical form of the product and method of delivery, and applications to the conveyor systems in step 2 is peculiar to the invention process.

The optimum physical form and temperature and method of preparation of the start material is determined for each product as described above and having regard to whether the raw material is from bulk storage in viscous or solid form or in a hot viscous form direct from an upstream process or in fresh or processed form.

The processing capacity and delivery rate of the product preparation and preparation apparatus is controlled by the downstream processing capacity of Steps 2–4.

By way of example, the Step 1 apparatus for the preparation and material sourced from an upstream production process would need only to comprise a positive displacement pump and applicator system with pipework heating and cooling means to deliver the start material through an extruder to the precise dimensions and temperature and pacing for entry to and processing in Step 2.

In other examples, the apparatus of Step 1 may comprise standard industry slicing, dicing, peeling, cutting, skinning, stoning, boning, filleting, type machinery fitted with specifically designed delivery and presentation apparatus and/or microwaveable processing containers for the transport of the product concerned.

By way of further examples, cheese products may be in solid form of natural and processed cheese- or cheese-based products of various shapes and sizes and presented to Step 2 at various temperatures.

The requirements specified in Step 1 also suit the processing of many other materials, for example those listed above. This list of examples shows that the potential range of products may be in liquid or viscous or solid form and in whole or reduced form, natural or pre-processed and across a wide range of raw product temperatures.

Typically, an "optimum" processing input temperature and physical form of the product is first determined to establish Step 2. "process start condition". These product requirements could normally be met by using standard industrial process machinery and control systems.

Step 2. (Initial Processing)

Figure 4:
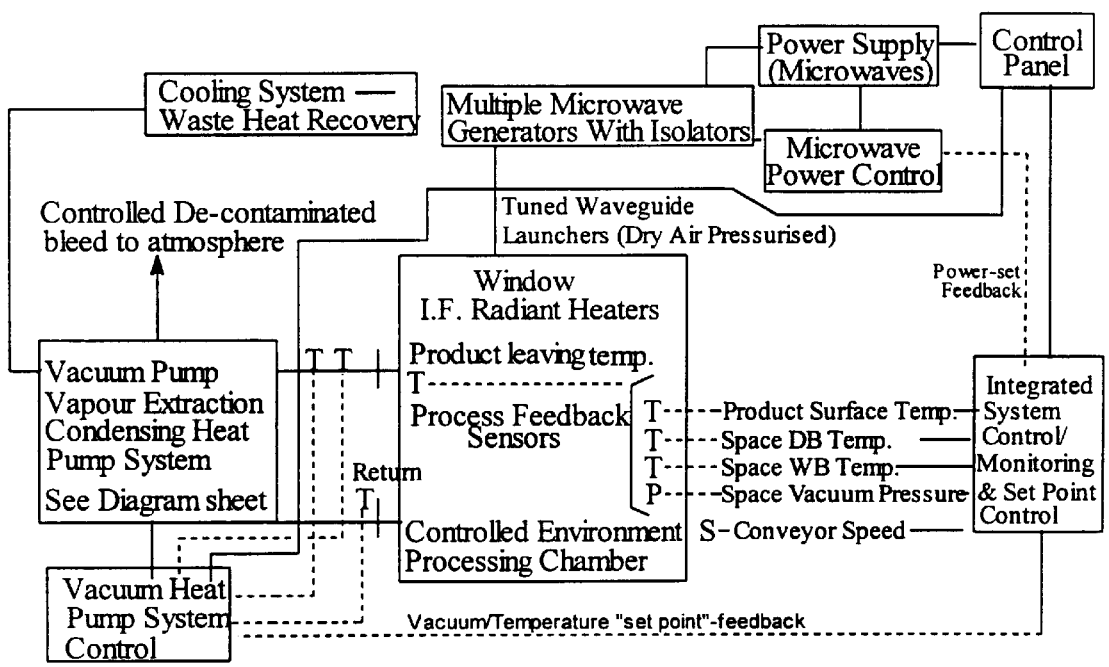
FIG. 4 shows Process Step 2 of the Process Block Diagram of FIG. 2.

The initial processing step, which is in accordance with the first embodiment and related clauses and is described above, and shown in FIGS. 2 and 4, is a process carried out under a controlled processing environment condition at atmospheric or sub-atmospheric pressure depending on the product.

The step incorporates infra-red radiation and optionally microwave processes and a vacuum pump vapour extraction/condensing heat pump environmental control system to maintain the processing environment pressure, temperature and saturation condition.

There is also provided an infra-red radiant heating system integrated with the heat pump drying and microwave systems whereby the surface condition of the product may be pre-conditioned if required to increase the resistance of the surface of the product to the passage of water vapour and volatile compound vapours emanating from within the product.

It should be appreciated that the product surface conditioning process which, by way of example, may include the formation of a surface skin or glazing or melting or hardening or other form of reduction in the surface porosity of the product and which does not spoil the product, is to create a barrier of resistance to the passage of vapours from within the product resulting in turn to an increase in the internal vapour pressures as heat is applied to the product and especially invasive heating such as microwave heating and causes the phenomenon known as "puffing" as the vapours under pressure break through the product surface barrier.

The processing ambient environment for this processing stage is typically maintained at a pre-determined adjustable pressure selected to best suit the processing needs of the product concerned. By way of example the ambient environment pressure may be atmospheric but preferably sub-atmospheric and selected to take advantage of the known reduction in vaporisation temperatures with reduction in ambient pressures.

In processing applications in which the processing environment is required to be maintained at sub-atmospheric (vacuum) conditions for example greater than 1000 Pa negative, the product entry and leaving conveying apparatus incorporates a conveyor transfer mechanism whereby the continuous product entry and exit from Step 2 is accomplished without significantly affecting the processing environment pressure in Step 2 processing chamber.

By way of example, for liquid, viscous and granular or diced material, this transfer may be accomplished by the use of interlocked rotary valves in the inlet and discharge transport systems in Step 2.

For other materials transported on conveyor belt or on pallets or in containers this transfer may be accomplished by a transparent transfer mechanism via can "air lock" neutral pressure zone having interlocked air sealed access doors or slides connecting between the Step 2 transport system and the respective feed and discharge conveyors.

By way or further example where the process in Step 2 is to be carried out at atmospheric pressure or sub-atmospheric pressures not exceeding 1000 Pa negative (to prevent vapour emission to the surrounding atmospheric) the product conveyor transfer differential pressure mechanisms may be omitted and a continuous single conveyor system used (if appropriate) from the delivery from Step 1 to the product entry at the final packaging stage—Step 4.

Step 2 control system provides for two (2) principal modes of operation.

(1) microwave and IR power control.

(2) product temperature control.

Under power control mode the power levels of the microwave magnetrons and I.R. heaters is set to a pre-determined set-point in the range 10–100% for microwave energy and 0–100% in 10% steps for the I.R. heaters.

The control systems maintains the actual power inputs relative to the set points. Under this mode the product surface temperature is not controlled but is displayed. The environmental control systems operates independent of the power input levels and maintains pre-determined pre-set values of entry air temperature and saturation and pressure conditions.

Under product temperature control mode the leaving product surface temperature is set at a temperature relevant to the processing environment dry bulb and wet bulb temperature and pressure and maintained by controlling the microwave power input. Under this mode the heat pump maintains the pre-set operating conditions for the processing environment. The microwave power input is continuously varied to maintain the set product temperature. This control mode provides a means whereby the dry bulb and wet bulb temperatures of the recirculating ambient air/vapour mixture in the product processing chamber which incorporates integrated microwave assisted vapour extraction/condensing, closed cycle, heat pump heating and drying system operating in a controlled, adjustable temperature and pressure environment with product temperature control is controllable relative to the surface temperature of the product being processed such that the drying process is engineered to operate as an adiabatic or isothermal process or at any pre-determined combined process between these two specific conditions, and is particularly relevant to the processing of materials which are sensitive to higher operating temperatures and potential vaporisation or aromatic compounds. Materials in this category include for example, some cheeses, meats, fish, fruits, herbs and spices.

Step 3. (Final Processing)

Figure 5:
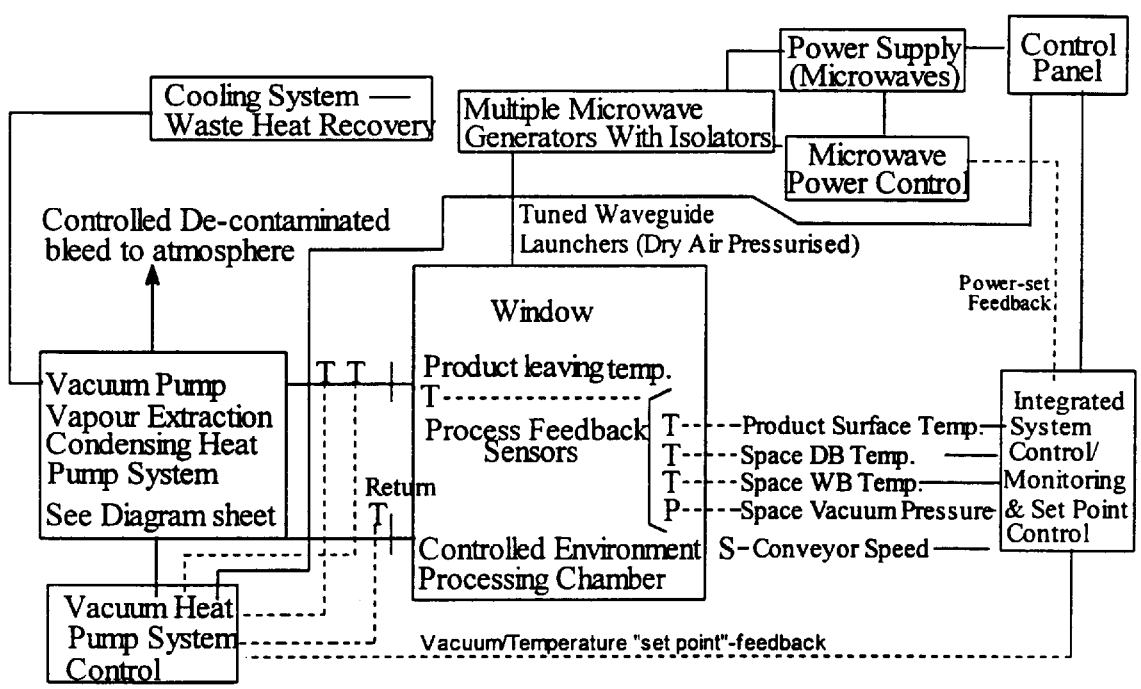
FIG. 5 shows Process Step 3 of the Process Block Diagram of FIG. 2.

This process step, which is in accordance with the second embodiment and related clauses and is described above, and shown in FIGS. 2 and 5, is a final cooking/drying/puffing/foaming/processing stage as applicable to meet the end product specifications and incorporating continuously variable product feed back controlled electromagnetic wave heating in a temperature and pressure controlled (atmospheric or sub-atmospheric) environment complete with vapour extraction/condensing system and emission control is the main production process by microwave heating, cooking, puffing, drying as required and delivery of the finished product ready for sterilisation, pasteurisation, de-naturing and cooling ready for packaging in Step 4.

Alternatively, Step 4 may for example include product de-naturing, pasteurisation or sterilisation, cooling and packaging as a separate but integrated process. This will depend on the nature of the product being processed and whether these product processes are required, for example, as products for human consumption or industrial products.

Step 3 may for example also include provision for infra-red radiation, browning of the finished products such as for biscuits and snack food.

In general respects the apparatus for Step 3 process will be similar to Step 2 apparatus and include a vacuum pump vapour extraction/condensing heat pump system and product conveyor transfer mechanism if required.

It should be appreciated that the influence of the processing ambient environment for example with respect to operating pressure and temperature and ambient saturation condition in the final production process is affected by the microwave heating characteristics such as microwave intensity and power/time control relative to the product moisture content, surface temperature and end product specification.

A means may be included whereby the processing ambient environment for this final production stage is maintained at a pre-determined adjustable pressure to best suit the final processing requirements having regard to the entering product temperature and moisture content and final product specification with respect to such aspects for example as finished product moisture content, desired surface texture condition and colour, degree of puffing, temperature sensitivities of the product being processed and sterilisation/time characteristics. By way of example the ambient environment pressure may be atmospheric but preferably sub-atmospheric and more preferably a specifically determined sub-atmospheric pressures to best suit the particular product processing characteristics and end product specification. By way of further example typical preferred ambient environment sub-atmospheric (partial vacuum) processing pressures for the manufacture of non-puffing products referred to in this specification is in the range of 0.90 to 0.98 atm and for puffing products 0.30 to 0.90 atm and for foaming products 0.10 to 0.30 atm. Other pressure conditions are equally provided to suit specific product needs.

The control system for Step 3 typically provides for four (4) operating modes. In its preferred from the control sub-system for the microwave heating and processing sub-systems there is provided for example:

(a) an operators control panel incorporating a series of keys and displays to indicate and control the sub-system status, operating mode, timing, power set valves vs actual, temperature set point values vs actual and parameters which define the behaviour of the PID controller.

(b) Mode key for selecting any one of four (4) operating modes or combination of modes throughout the complete production process and including the preferred modes of:

(1) power control (2) temperature control (3) power profile (4) temperature profile.

(c) A SET KEY function in which the preferred embodiment is that the set key is used to make or change the setting for power set point value, temperature set point value, proportional, integrative, derivative and Tf parameters of the temperature controller and the settings made can be changed at any time during the process without any shut-down of the complete process or any sub-system process.

(d) In POWER CONTROL mode user can set the power set point value in the range from 0 to 100%. Proportional-integrative controller incorporated in software maintains the actual power value relative set point value. The actual temperature of the heated product is displayed in this mode but is not controlled.

(e) In TEMP CONTROL mode user can set the temperature set point value in the range from 0 to 200° C. and proportional-integrative-derivative controller maintains the actual temperature around set point value. Power set point and actual value and temperature set point and actual values is displayed in this mode.

(f) In POWER PROFILE mode user can set up to 99 time periods (the duration of each time period can be up to 999s). For each segment user can set start power set point and final power set point.

(g) In TEMPERATURE PROFILE mode user can set up to 99 time periods (the duration of each time period can be up to 999s). For each segment user can set temperature set point and final temperature set point.

The operating modes provide for a wide range of set points conditions to suit the wide range of potential applications of the process.

In lower temperature applications such as for the processing of cheeses, meats and fruits, the "temperature control" and "temperature profile" the settings and operation would typically relate to the processing ambient conditions as noted for Step 2 "product temperature control".

A PAUSE KEY operational control on each selected magnetron or banks of magnetrons may be provided in which the operation of the PAUSE KEY will suspend the timing, function and power supply to the magnetron(s) is switched off and the filaments remain on for an adjustable pre-determined period of typically 10s on completion of which the power supply is automatically switched off and operator alerted.

Step 4. (End Product Packaging)

Figure 6:
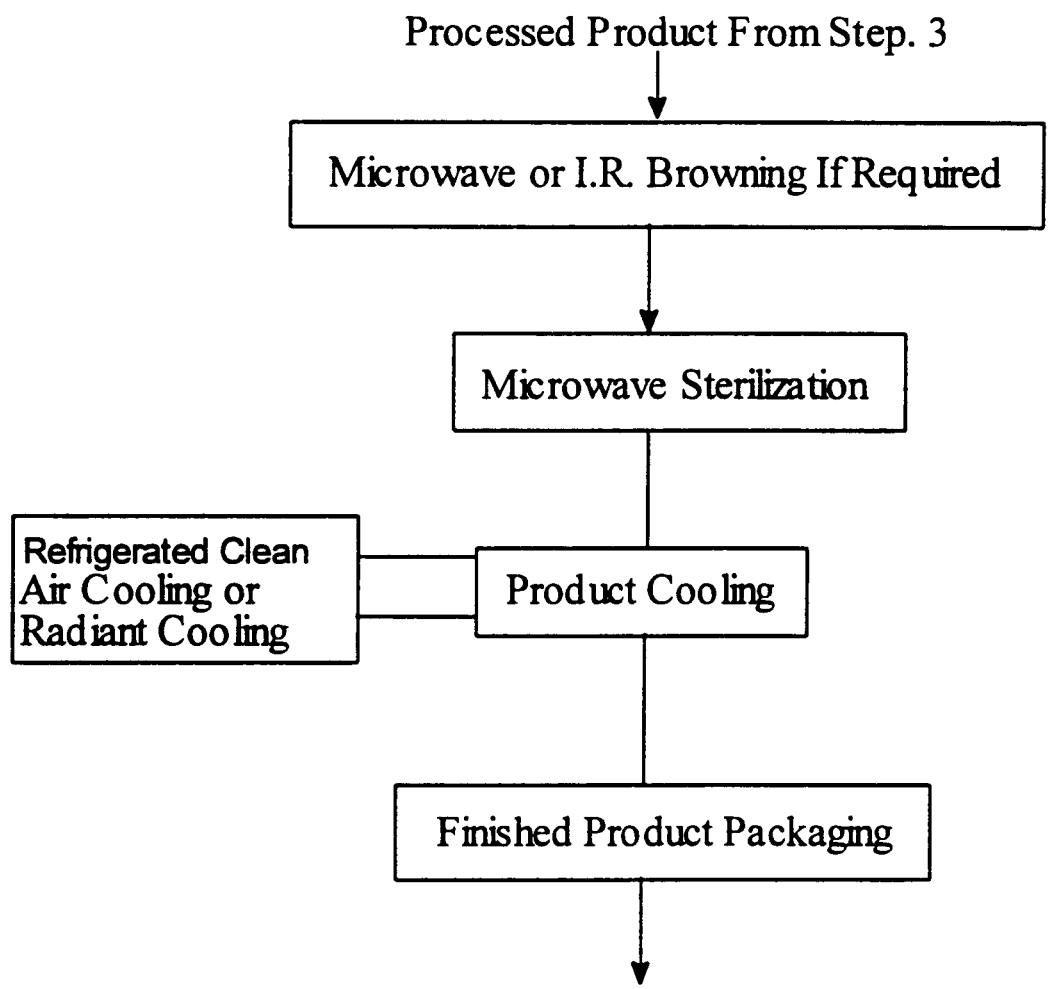
FIG. 6 shows Process Step 4 of the Process Block Diagram of FIG. 2.

This step is as described above, and as shown in FIGS. 2 and 6, typically involves product microwave sterilisation and packaging and cooling stage and as noted in the specification the process of sterilisation and browning can be incorporated in Step 3. The end product would then pass through a cooling section to the product packaging machine. Industry trend is for the sterilisation of the product to be incorporated in the packaging stage. Microwave sterilisation is a proven process and appropriate packaging and control systems are commercially available. There may be provided as an integral part of the final processing stage as described in Step 3 the optional additional process of product surface browning which is accomplished for example by controlled infrared radiation of the product as a final process. As an integral part of the final processing stage as described in Step 3 the optional additional process of product sterilisation by microwave heating prior to cooling and/or packaging of the finished product may be included. In its preferred form there is provided in step 3 an integrated cooking, drying, puffing, foaming and if required product browning and sterilisation stages operating in a controlled, adjustable temperature and pressure environment.

Conveyer System

There is provided in the initial and final processing stages of the method of manufacture a product processing conveying system or conveying arrangements incorporating as applicable the following features:

(a) transparency to microwave radiation.

(b) Incorporating by way of integral forming of the conveying platform specific shapes, indentations or processing containers and attachments constructed of microwave transparent materials in part or in whole.

Means for the automatic separation of the product from the conveying platform or container without recourse to the application of release agents.

Means for the separation and draining off and reclaiming of any oils formed in the process in such a manner as to eliminate the recycling of any oils which might give rise to burning and contamination of the subsequent products being processed.

(e) Variable speed conveyor control interlocked with the integrated process control system to provide a wide range of process resistance times.

Microwave Control & Feedback Mechanisms

General

Processing step 3 and typically processing steps 2, and 4 of the invention each incorporate at microwave processing system.

Figure 7:
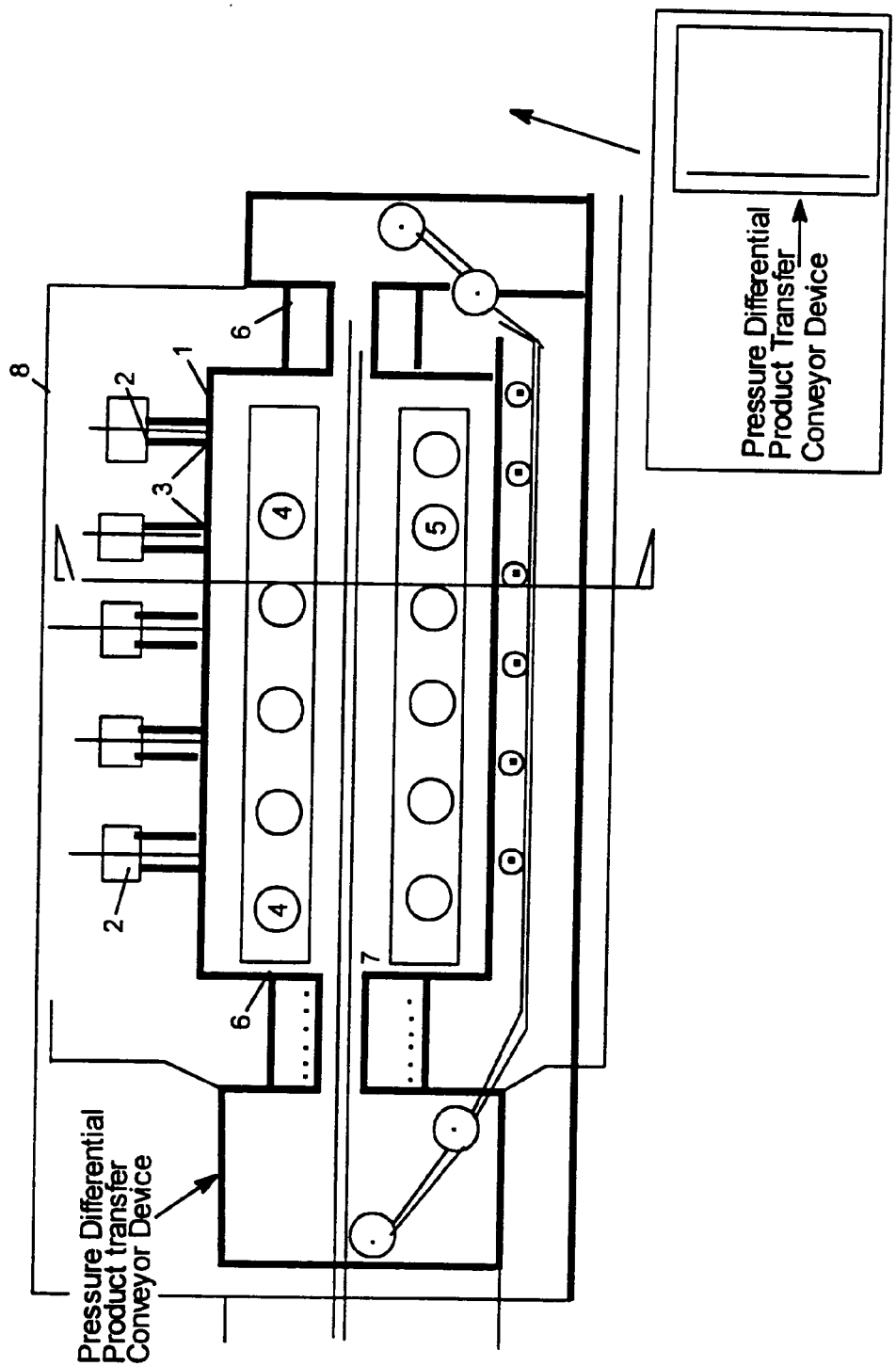
FIG. 7 shows a Typical Microwave Process Chamber.

A typical microwave processing chamber is shown in FIG. 7. The components are:

1. Tuned Microwave processing chamber—atmospheric or vacuum.
2. Microwave generators (magnetrons) and waveguides.
3. Dry air pressurized microwave launches with windows.
4. Controlled Temp./humidity supply air plenum and inlets from heat pump.
5. Saturated vapour manifold and outlets to heat pump.
6. Water load microwave emission chock sections.
7. Variable speed product conveyor.
8. Processing chamber and equipment housing.
9. Return conveyor assembly.

The microwave power control requirements are different for each Step. The general functional requirements of the control systems are described above for each of the Steps.

Microwave Energy Input

Microwave energy is supplied to the separate processing chambers in process Steps 2, 3 and 4 by one or more microwave generators (magnetrons) for each Step as determined by the product processing requirements. The magnetrons may be connected to the processing chambers directly via waveguide launching sections or via a system of waveguides from remote rack mounted magnetrons. There may be provided an electro-magnetic wave heat generator and transmission system of waveguides and the like and generator cooling system incorporated in and integrated with the production machine in small capacity production machines or in preferred form as free standing microwave heating energy modules with energy transmission by wave guide connection to the processing chambers of larger capacity production machines. There may be an arrangement whereby the electro-magnetic wave heating energy may be transported by wave guides or the like to various locations within the production machine and at energy input levels which may be varied automatically to satisfy process heating and product surface temperature conditions relative to required rates of cooking and dehydration throughout the production cycle.

In the preferred form the magnetrons will be water cooled and mounted in close proximity to the processing chamber and connected thereto by purpose-made launching pieces fitted with tuning stubs, matching flanges with RF gaskets and PTFE or other microwave transparent window to separate the waveguide launching piece atmosphere from the product processing compartment atmosphere.

The launching piece or waveguide connection piece between the magnetron and the processing compartment is preferably fitted with an arc detector and is slightly pressurised to above atmospheric pressure with dry air so as to increase the breakdown voltage within the waveguide under humid environments (see FIG. 7).

Figure 8:
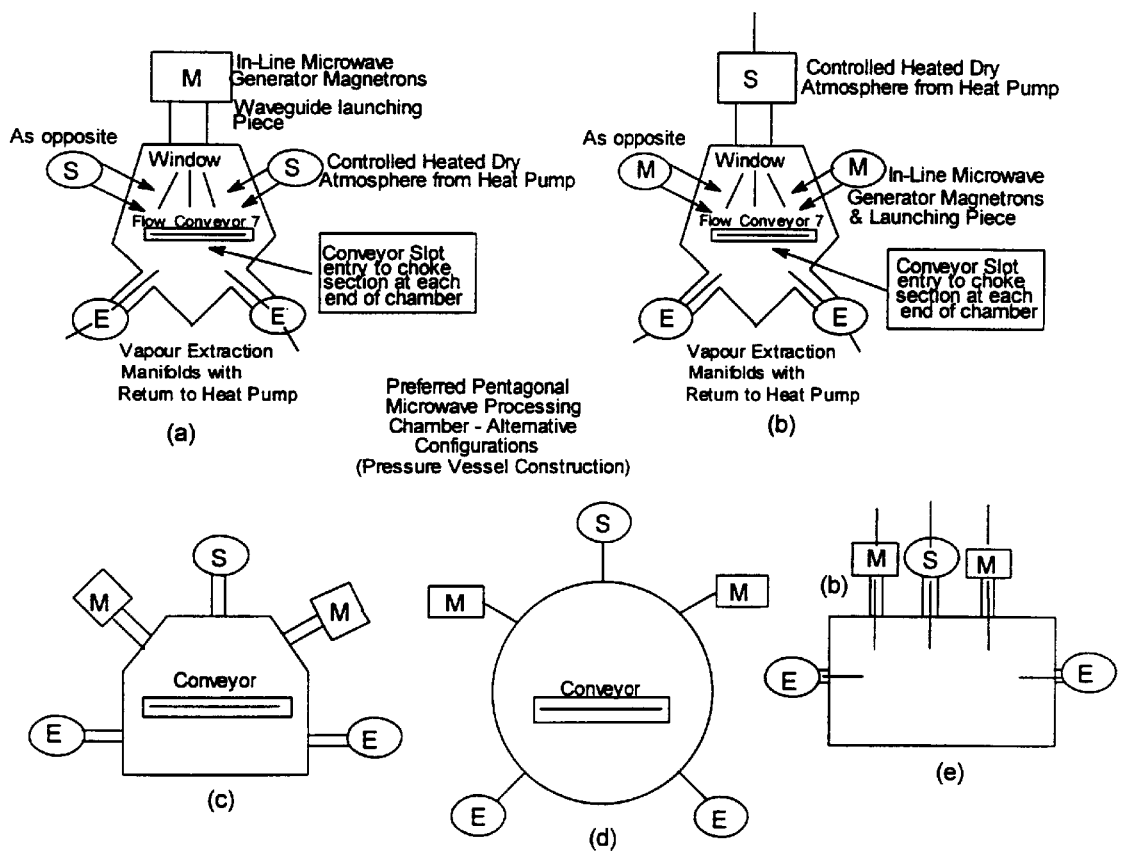
FIGS. 8(a)–(e) show Typical Microwave Processing Chamber—Alternative sections.

The geometry of each processing compartment and the disposition of the microwave connections in its preferred form is tuned and matched for high efficiency microwave heating performance with the minimum of microwave radiation coupling between adjacent magnetron inputs to ensure stable operation and smooth variable power control (see FIG. 8).

The geometry of the microwave processing compartments in its preferred form has an equal sided pentagonal cross section to more effectively and evenly distribute the microwave energy intensity with respect to the product. Other geometrical forms of tuned microwave processing chamber designs are also suitable for the invention process.

The processing chamber for Steps 2 and 3 are designed to operate either at atmospheric pressure or preferably sub-atmospheric (partial vacuum) conditions.

To further provide for stable microwave system operation and to ensure the long life of magnetrons, in its preferred form the magnetrons are fitted with isolators to absorb reflected energy and dissipate this energy through a dummy water load.

Effective shielding against the emission of electromagnetic waves from the microwave radiation processes carried out within the machine is generally provided—such shielding complying with internationally recognised health and safety standards.

In all of the production process chambers and conveying systems in all of their forms and configurations a level of air tightness as typically required to minimise air infiltration to the machine and to satisfy the requirements for sub-atmospheric pressure operation.

Microwave Power Control—General

Background information on microwave power supply and other variables and operating modes and typical feedback arrangements for providing constant input power stabilisation is described below.

Magnetron Power Supply—Background

The efficiency of the microwave magnetron is typically constant for a fixed load under all operating conditions. To stabilise the magnetron power it is only necessary to stabilise the magnetron input power.

The output power of the magnetron (the microwave generator) can be influenced by:

(1) mains voltage variations (the major influencing factor).

(2) an increase in temperature of the ferrite magnets. This weakening the magnetic field and lowers the anode voltage.

(3) changes in the RF load which alters the anode voltage at a given current. This influence is of lesser significance when using a tuned microwave system in continuing process applications having substantially fixedly load characteristics for example in the independent processing Steps 2, 3 and 4 of the invention. The proposed control system in the invention caters for these load changes.

Mains Voltage Variations

Power supply authorities do not guarantee the mains voltage will not be subject to voltage variations, power surges or voltages spikes which are caused by varying loads and demands, faults and switching transients in the distribution system.

Typically the mains supply is delivered at 220 to 240 volts AC and at a frequency of 50 Hz or 60 Hz depending on the country and distribution system in place. Three phase power supply may typically vary between 380 and 415 volts AC at 50 or 60 Hz, again depending on the characteristic of the main supply system.

Typically, the mains voltage may fall by up to 5% even in well regulated distribution systems. Unless compensated by the control system these mains voltage variations will cause wide fluctuations in the output power of the magnetrons.

For example, the output power of a continuous wave magnetron rated at 5 KW at normal mains voltage can fall to 0.5 KW with a drop in mains voltage of 10%.

Typically commercially available magnetron power control systems stabilise the output power against variations in mains supply voltage by varying the magnetron electromagnet coil current and varying the filament voltage to maintain an acceptable cathode temperature. Providing the internal impedance of the HV power supply is low, only small changes in the electromagnet coil current are needed to produce large changes in magnetron output power.

Figure 9:
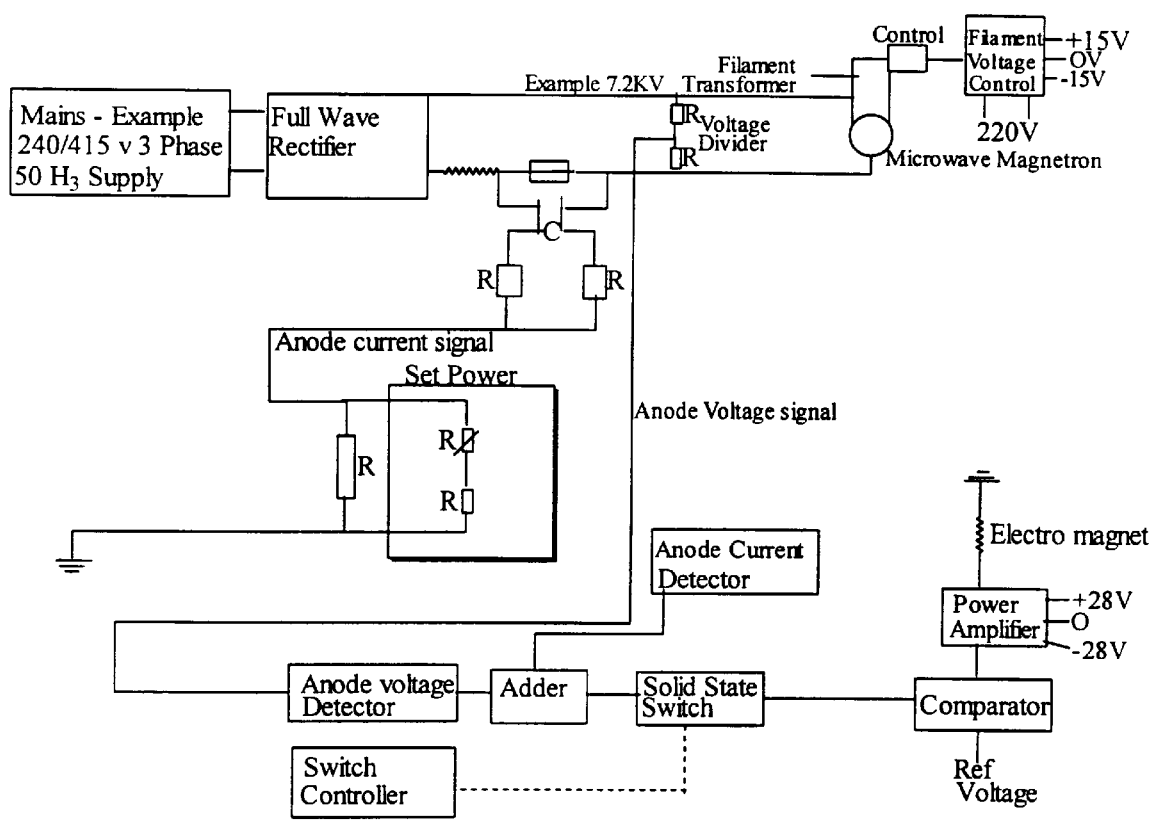
FIG. 9 shows a Microwave Power Control System—Schematic.

FIG. 9 is a block diagram showing a typical magnetron Power Control system using the principle of constant input power stabilisation which by way of example could be incorporated in the basic microwave power control in the invention.

Magnetron Variable Power Control

As already indicated the production process typically incorporates four (4) distinct processing steps as depicted in FIG. 2.

Process step 3 and optionally process steps 2, and 4 incorporate microwave energy processing which is required to be independently controlled to respond to processing criteria relating to the particular process step.

The optimum microwave power input to the process will vary for different products being processed and is influenced by the interaction of the following processing parameters which will be sensed and electronically processed as signals to provide for stable system operation and continuously variable microwave power control in conjunction with the power stabilisation control not on FIG. 9.

The processing inputs include:

(1) the surface temperature of the product being processed at entry and exit from each process Steps 2 to 4.

(2) the dry bulb and wet bulb temperature of the processing environment in Steps 2 & 3.

(3) the respective processing chamber pressure in Steps 2 & 3.

(4) conveyor speed in each step.

The control system described in the invention provides for four (4) basic operating modes which are applicable to Step 3. Two (2) operating modes apply in Step 2 and Step 4.

The four modes are:

(1) Magnetron power control.
(2) Product temperature control.
(3) Microwave power profile.
(4) Product surface temperature profile.

The most appropriate operating mode or combination of modes throughout the manufacturing process will be dependent on the product characteristics and the end-product specification.

The product characteristics and end product specification will fundamentally determine the optimum processing environment e.g. whether at atmospheric pressure or slight or substantial sub-atmospheric (vacuum) pressures. The processing ambient pressure will be pre-determined for each product and pre-set at start up of the particular product production run. The operating ambient temperature and processing atmosphere dry bulb temperature and atmosphere saturation conditions will be maintained by the vacuum pump vapour extraction/condensing, heat pump systems, indicated in FIGS. 2 and 3. This control system may use commercially available control equipment and temperature, pressure and humidity sensors and feedback controls. The environment control system could be expected to operate reliably and in a stable fashion when the operating parameters are pre-set for the particular process.

The continuously variable power control of the microwave magnetron energy input to the process provides a ready means whereby the temperature of the product being processed can be accurately controlled to a specific set point relationship to the dry bulb temperature of the processing environment atmosphere. As noted previously this control feature enable isothermal and near isothermal moisture transfer to take place between the product and the atmosphere without sensible heat exchange. This control feature of the invention enable drying of heat sensitive products to be achieved in low temperature environment with appropriate vapour pressure differences.

As the microwave processing requirements in each process Step will vary considerably across the range of potential product applications the microwave power control system in the invention provides for the continuously variable control of power input of each magnetron. This enables the microwave power levels of each magnetron and bank of magnetrons serving each processing chamber to be either pre-set to provide a specific power output or alternatively a profile of power outputs in each compartment to suit the processing needs of that compartment. These pre-set conditions may be set for continuous performance at the selected power output (s) or power profile of may be continuously varied by product temperature feedback microprocessor control.

In its preferred form the control system will operate on a continuous flow production basis by may also apply to batch type processors with the introduction of process-time (product residence time) control applied to the microwave fixed power or power profile settings.

The manufacture of microwave magnetrons specify particular time delays to be incorporated in various circuits of the power control system for safety reasons during start-up and shut-down of the system. These safety provisions form an integral part of the power control system

Magnetron Power Control System

Figure 10:
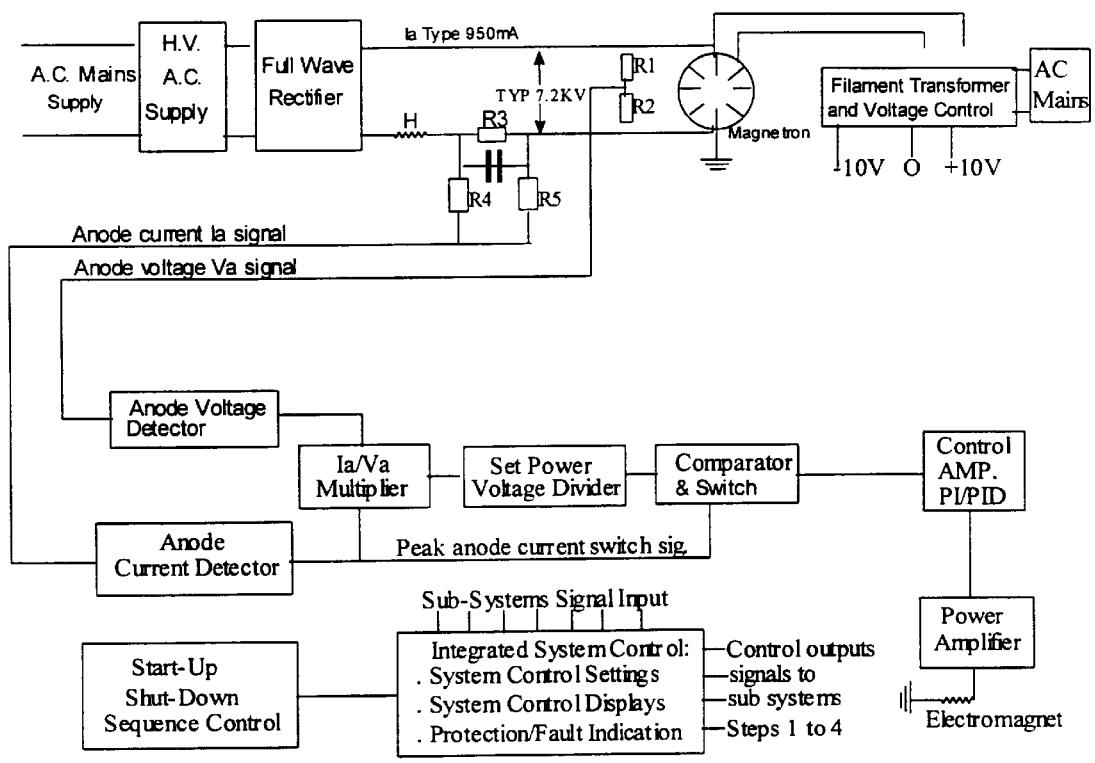
FIG. 10 shows a Integrated Processing System Microwave Power Control—Schematic.

The magnetron power control system in the preferred form of the invention is depicted in FIG. 10 and provides the following basic control features:

(a) good dynamic regulation.
(b) accurate and stable pre-setting of the RF output power in the range 10–100% of each magnetron for a wide range of anode voltage and anode current conditions.
(c) power related signal for filament voltage control.
(d) magnetron output power display in watts.
(e) incorporation of protection circuits.
(f) provision for incorporating integrated system feedback signal control of magnetron power settings.

Power Stabilisation

As previously noted the anode voltage of the magnetron depends on the AC mains voltage variations and the internal resistance of the power supply, the latter being temperature dependent. The anode current depends on the anode voltage, the electromagnet current (for some magnetron designs) and the magnetron system load. By way of example, the following description refers to the control supply for a typical 5 KW continuous wave water cooled magnetron. Other magnetron control systems will vary in control detail but not in principle.

Microwave Power Output Measurement

The anode voltage signal is typically −7.2 V and the anode current signal is 950 mA. Both signals are multiplied electronically such that the output Xa is proportional to the real RF power that is $Xa=k(-Va)1a$ where the proportionality constant k is used to limit Xa to 10 V (where Va is the anode voltage and 1a is the anode current). A voltmeter connected to the output of the multiplier can be used to indicate the microwave power.

Setting the Power

An adjustable DC reference voltage +1 to +10 V from a potential divider is used to set the input power level. The minimum voltage is set by the permanent voltage divider comprising specific resistor ratings. During standby the input voltage to an impedance converter is kept at 0 V by a closing switch. When this switch is operated the input voltage rises to the present value (time constant 1=0.1 sec). An invertor is provided with a reference voltage of −1 V to −10 V.

Control Amplifier

A control amplifier with P.1 characteristics keeps the microwave power constant at the set value even when large mains voltage fluctuations occur at low anode currents. The input signal is the difference between the signal representing the desired power and that representing the instantaneous power. The signal output of the control amplifier is limited to±10 V by zener anodes. The use of P.1 amplifier provides good dynamic regulation. If necessary this regulation can be improved by converting the amplifier to a P.1 D amplifier.

Power Amplifier for Electromagnet Supply

The output of the control amplifier is the input for an integrated power amplifier which has short circuit protection and a current limiter. This amplifier is stable in operation even at low input voltages and provides a smooth transition as the energisation of the electromagnet reverses. The electromagnet can be turned off by a signal from the controller. Provision is made to prevent microwave energy being generated when anode voltage falls below the manufacturer's recommendations.

Anode Current Control

An impedance converter and comparator monitor the peak anode current. The output of the comparator is used to shut down the power supply if necessary.

Filament Voltage Control

The control system for filament voltage control utilises a standard available control package which is matched to the filament operating requirements of the particular magnetron characteristics.

When the anode current increases, the filament voltage is reduced to prevent overheating the cathode. During warm-up with no anode voltage applied, the filament voltage is 5 V at nominal mains voltage. During operation, the filament voltage is reduced to 4 V and thereafter controlled between 0 V and 4 V depending on the anode current.

In a typical filament voltage control circuit, a signal proportional to the magnetron current is amplified and photocoupled to the input of a TCA280A used to control a triac which regulates the filament voltage according to the derating curve of the magnetron.

During warm-up, before the anode voltage is applied, the control circuit is by-passed and the triac is shunted by a switch.

The maximum and minimum filament voltage are set with the anode voltage off, and a switch opened to activate the triac.

To set the maximum filament voltage, the input signal is set to zero and adjusted for a filament voltage of 4.0 V measured at the magnetron.

To set the minimum filament voltage current of 950 mA is set and adjusted for a filament voltage of 0.5 V.

Start-Up and Shut-Down Procedures

These procedures are specified by the magnetron manufactures and by way of example typically include the following sequences:

1. Monitoring of the magnetron cooling circuit for satisfactory operation for about 3 sec before operating the filament heating.
2. Start cathode heating with a fixed filament voltage of 5 V and allow a pre-heat of about 15 sec before operating the magnetron.
3. Before switching on the anode voltage, the electromagnet current should be maximum (positive) to prevent the magnetron oscillating when the anode voltage is outside the operating range of the power stabilisation circuit (i.e. when the anode voltage is less than about 5 kV).
4. Power stabilisation and filament voltage control active. The r.f. output power increases to the set value and is stabilised at that value.

Integrated System Control

This control system (see FIGS. 4 and 5) provides for the integrated control of the sub-systems in process Steps 1 and 4 to operate in a continuous sequential production mode for the manufacture of products referred to in the invention specification. The integrated process control system incorporates for example temperature and pressure sensing and power and time control devices and computerised programmable logic controllers and other control and feed-back and monitoring devices and operators key board and ancillary equipment and devices necessary to control the complete manufacturing process throughout all stages of product preparation, processing and packaging in accordance with a predetermined, adjustable, programmable, processing time profile.

The control system incorporates the following basic features:

1. Master control including emergency shutdown of the mains power supply to the production machine including the supplies to the various sub-systems electrical and control panel in Steps 1 and 4.
2. Hard wired and signal inputs from machine safety interlocks and sequence interlocks for example from magnetron cooling systems, conveyors, product feed, access doors, heat pump systems.
3. Input signals from remote sensing devices including product surface temperature measurements, heat pumps drying air DB temperature and humidity, processing chamber pressures, conveyor speeds as applicable.
4. Input signal transmitters and converters to feedback signal form to match the particular sub-system control requirements.
5. Programmable microprocessors for the pre-setting of sub-system controls and process operating modes, for example magnetron output power and profile, product surface temperature and processing chamber atmospheric dry bulb temperatures, humidity and pressures.
6. Feedback signals from sub-systems and converters to provide display of individual magnetron power and compartment magnetron power profile, product surface temperatures and processing environment dry bulb temperatures humidity and pressures relative to pre-set conditions throughout the production process.
7. Centralised fault indication, display and alarms.

This control system may use commercially available control equipment and ancillary devices.

Vapour Extraction/Condensing Heat Pump System

General

Processing Steps 2 and 3 of the invention each incorporate a vapour evacuation heat pump system to automatically control the processing environment in that Step to pre-set adjustable conditions of dry bulb temperature, chamber inlet air humidity and processing chamber pressure, ranging from atmospheric pressure to sub-atmospheric pressures. Each include an air/vapour extraction system and heat recovery and transfer assembly of one or more circulating fans and one or more heat recover and transfer heat exchangers to circulate and control the temperature and humidity of the return air/vapour returned to the production chambers and to the vapour condensing heat pump assembly. Typically there is provided a refrigeration condensing heat pump assembly comprising one or more refrigeration compressors, evaporators, condensers, circulating fans, vapour by-pass dampers, heat exchangers and ancillary equipment and interconnecting pipeworks and control system all forming an integrated sub-system component of the preferred production system. This may comprise a closed cycle vapour extraction/condensing refrigeration system to evacuate moisture and other cooking and drying vapours from the final processing stage cooking and drying compartments designed to maintain the pre-set process ambient pressure and temperature conditions and to eliminate any odours or other emissions to atmosphere. There is envisaged a heat pump system in which the heating energy to heat the dried recirculating ambient air is reclaimed from the rejection heat of the vapour condensing cycle and elevated to its operational temperature wholly or mainly by the reclaim and use of waste heat generated by the microwave magnetron units incorporated in the process stages.

Figure 11A:
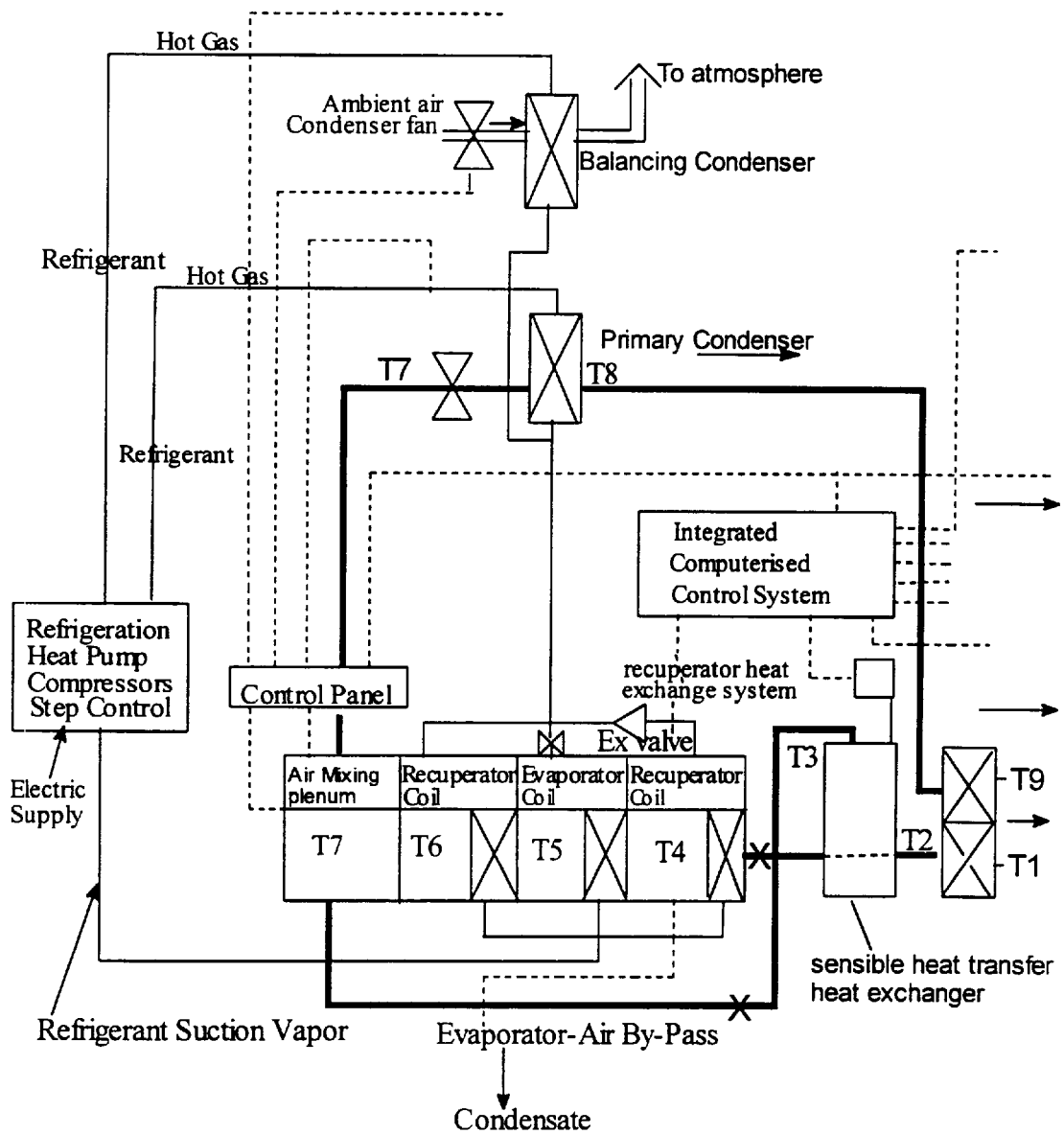
FIG. 11(a) shows a Microwave/Heat Pump System—Schematic Diagram (Part (a))
Figure 11B:
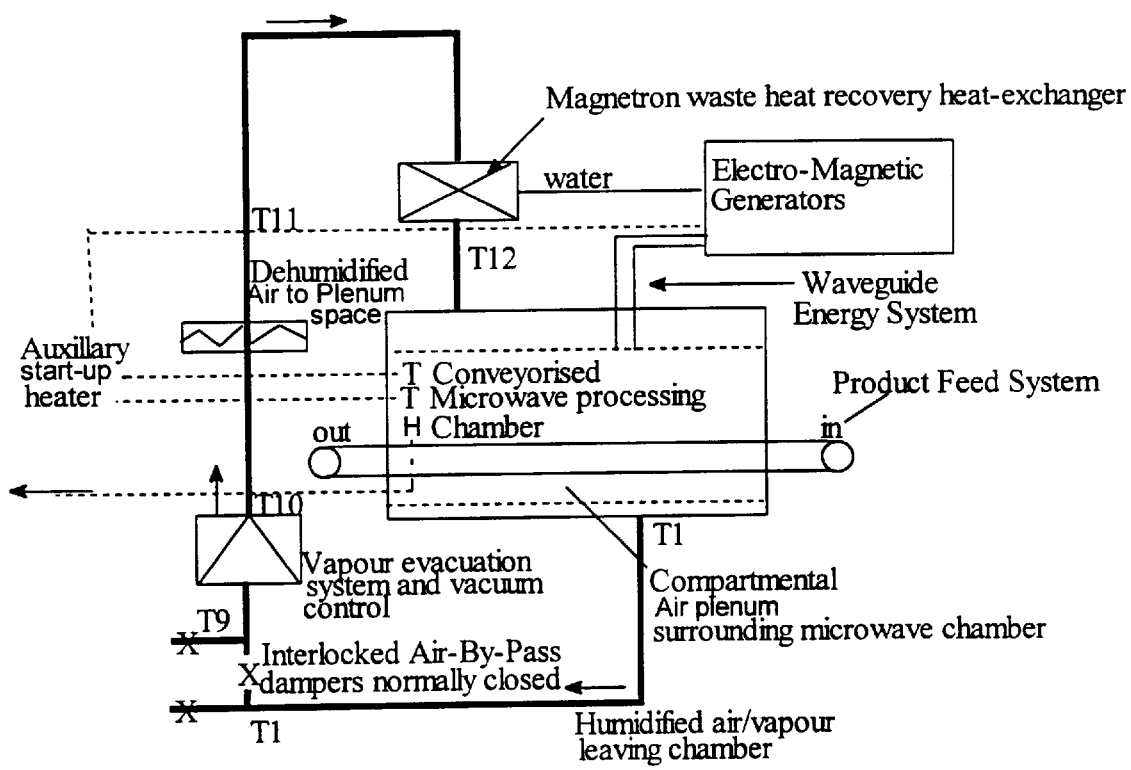
FIG. 11(b) shows a Microwave/Heat Pump System—Schematic Diagram (Part (b))

The equipment componentry of the vapour extraction heat pump system to process the range of product application described in the invention is shown if FIGS. 11(a) and (b). By way of example typical refrigeration suction temperature ranges from −5° to +5° C. and condensing temperatures 40° to 80° C. but lower suction temperatures and higher condensing temperatures may be used.

Hot drying air having evaporated moisture from the product being processed is evacuated from the processing chamber in a partly saturated condition, typically above 50% saturation and at a leaving temperature T1 typically 40–60° C. for example in agricultural product processing.

In normal operation this air passes through a sensible heat transfer heat exchanger of the plate type or preferably of the refrigeration heat pipe type where sensible heat is transferred from T1 air stream to T8 air stream when the former is at a higher temperature than T8.

Air at a reduced temperature T2 but with the same moisture content of T1 leaves the primary side of the sensible heat transfer heat exchanger. Depending on the temperature of this air, for example being more than 5° C. above the climatic wet bulb temperature in the area or containing low temperature condensable vapour compounds or particulate matter, passes through a direct contact dehumidifying heat exchange air scrubber or bypasses this equipment and enters the heat pump dehumidifying air handling unit at temperature T3 at an increased saturated condition or at T2 temperature as applicable.

The heat pump dehumidifying apparatus incorporates a condensing evaporator coil preferably equipped with air to water run-around heat exchangers (recouperators) to reduce the evaporator coil air inlet temperatures T4 to the lowest practical saturated temperature condition by by-passing a controlled proportion of the air stream sensible heat around the evaporator.

The refrigeration heat pump compressors operate under conventional capacity step control to maintain the discharge air temperature T5 from the evaporator coil to a fully saturated condition with a dry bulb temperature typically being 5–8° C. above the design refrigerant suction temperature.

Dehumidified low temperature air T5 then passes through the downstream run-around sensible heat transfer heat exchanger and leaves this heat exchanger at an increased temperature T6, typically 10 to 30° C. above T5 depending on the entering condition T2 or T3.

The required humidity of the recirculating air ultimately admitted to the processing chamber at temperature T12 is controlled by by-passing a proportion of air T2 or T3, as the case may be, around the refrigeration evaporator and run-around heat exchangers, to mix with air T6. This results in the air being increased to a temperature T7 and having the required absolute humidity moisture content required in T12.

The dehumidified controlled moisture air T7 is drawn by a variable speed fan to discharge T7 air through the primary air cooled condenser after absorbing the fan heat. The refrigerant heat energy in the form of hot refrigerant gas generated by the condensation process on the evaporator coil is transferred via the condenser to air T7 the temperature of which is increased to T8. Load balancing is achieved through the operation of the secondary condenser.

The heated dehumidified air T8 then passes through the secondary side of the sensible heat exchanger (primary side T2) and depending on the temperature of T2 relative to T8 will increase the temperature of T8 or T9.

Air at T9 passes through a vacuum pump blower unit. This apparatus controls the volume of air delivered to the processing chamber and the bleed volume delivered to atmosphere to maintain the processing chamber at the pre-set pressure condition.

The air entering the vacuum blower at T9 absorbs the blower waste heat and emerges at an increased temperature T10 typically being a 1–2° C. increase above T9.

Air at T10 then passes through auxiliary start-up heaters (using during start-up only) and then passes through an air to water heat exchanger in which the waste heat generated by the microwave magnetron cooling system raises the temperature of T10 air for example to 50–60° C. with low relative humidity typically being between 10 to 20% by not limited to these temperature and humidity ranges.

The refrigerant suction temperatures and condensing temperatures and processing atmospheric conditions stated are by way of example only and relate to typical processes involving cheeses, meats, fruits and other agricultural products. The heat pump and environmental control system as described and shown in FIGS. 11(a) and (b) can be used to satisfy widely varying process requirements.

Heat Pump System Control and Feedback Mechanisms

The heat pump evacuation/condensing sub-system described and indicated in FIGS. 11(a) and (b) uses industry standard sensing and signal transmitting devices for the measurement and feedback of the process environment temperature, humidity and atmospheric pressure. Standard industry microprocessor control systems and controllers and actuators are used for the control of valves, by-pass dampers, variable speed fans, pumps and refrigeration compressor capacity controls.

In practice the optimum environment processing conditions for the processing of a particular product will be pre-determined by the physical, chemical and dielectric properties and the processing characteristics and end product specification of that product.

The control system enables the pre-set dry bulb temperature and humidity of the air entering the processing chamber (T12) and the pre-set operating atmospheric pressure of the chamber to be maintained at the pre-set conditions. Feedback signals are provided by temperature and humidity sensors installed at the inlet of T12 to the processing chamber and by pressure differential measurement between T1 and atmospheric pressure at exit from the chamber and for the measurement of product surface temperature in the processing chamber (see FIGS. 11(a) and (b).

The processing environment heat pump system for Step 2 is normally be set for a different set of processing conditions then for Step 3. The systems for each Step operate independently and can be re-set independently of each other.

The optimum processing environment conditions and the temperature difference (if any) between the product surface temperature and the dry bulb temperature of the processing environment are pre-set for each Step. This temperature difference is maintained by controlling the microwave input power in each Step when operating at coordinated pre-set conveying speeds.

In other examples where the processing environment temperature is of prime importance for product quality control or other processing reasons the control system allows for the pre-set environment conditions to be re-set during production and then automatically maintained. The control of the microwave input power responds to the changed environmental conditions to maintain the pre-set differential temperature (if any) between the environment dry bulb temperature and the product surface temperature. These settings may vary for each Step.

EXAMPLES

Description of Processing of Examples

Equipment

The equipment used for processing Examples 1–7 comprised:

(a) 1000 watt variable power microwave oven fitted with separately step controlled 1500 watt ceramic infrared radiant heater will adjustable platform to place the material at a pre-determined distance from the radiant heater.

(b) 1000 watt variable power microwave oven fitted with a controllable return to zero product turntable and separately controlled mode stirrer to evenly distribute the microwave energy in the processing chamber.

(c) digital scales for measuring weight of start material and end product weight.

(d) temperature probes and dry and wet bulb thermometers for measuring the oven ambient temperature and humidity and product internal and surface temperatures.

(e) microwaveable product containers to hold the sample material during the processing stages.

(f) dual container hot water melting pot to convert solid sample material into a viscous starting material at the temperatures noted in the Schedule of Examples.

(g) independent laboratory analyses of start and final product material.

Methodology

The sample material was sourced from cool solid cheese blocks held in vapour sealed plastic containers at 4° C. bulk temperature.

For viscous material the start material was first converted to a viscous form at the required temperature by using the melting pot noted in (f) above.

The sample material in the measured weights and form noted was then placed in the pre-processing equipment described in (a) above.

(1) This equipment was operated at atmospheric pressure, whilst irradiating the sample at low 10% microwave power setting with varying distances of the product below the infra-red radiant heater and at varying times of exposure. Processing time and chamber temperature and humidity and product surface temperature and product bulk temperature were measured a the start, and point and on completion of this initial processing step which equates to Step 2 of the invention process. The data given for the Examples 1–7 relates to the steady state processing conditions achieved for each sample.

(2) On completion of Process (1) the material was immediately transferred to the final processing stage equipment (b). This process was carried out under atmospheric pressure conditions with full microwave power at 1000 watts input and measured processing environment temperature and humidity. The processing time and chamber temperature and humidity and product surface temperature and product bulk temperature were taken at the commencement, mid point and on completion of this processing step which equates to Step 3 of the invention. The data given for the Examples 1–7 relates to the steady state processing conditions achieved for each sample.

The data for the respective samples 1 to 7 referred to in the Schedule of Examples relates to the temperature, humidity and pressure parameters noted in the invention process at T(0) H(1) and P(1) etc.

The corresponding data for the Examples 1–7 was as follows:

| Parameter | Example 1 Cheddar cheese, solid 100 g | Example 2 Cheddar cheese, viscous 100 g | Example 3 Cheddar cheese, viscous 100 g | Example 4 Romano cheese, solid 25 g | Example 5 Romano cheese, viscous 100 g | Example 6 Pepato cheese, solid 50 g | Example 7 Pepato cheese, viscous 100 g |
|---|---|---|---|---|---|---|---|
| Sample Weight | 100 g | 100 g | 100 g | 25 g | 100 g | 50 g | 100 g |
| Presentation form | Slice 10 mm thick | Viscous strip 8 mm thick | Viscous strip 8 mm thick | Cube | Viscous strip 8 mm thick | Cube | Viscous strip 8 mm thick |
| T(0) | 4° C. | 4° C. | 4° C. | 4° C. | 4° C. | 4° C. | 4° C. |
| T(1) | 5° C. | 50° C. | 50° C. | 6° C. | 50° C. | 5° C. | 60° C. |
| T(2) | 18° C. | 32° C. | 30° C. | 22° C. | 35° C. | 21° C. | 38° C. |
| T(2)$^1$ | 22° C. | 57° C. | 60° C. | 37° C. | 63° C. | 35° C. | 65° C. |
| T(2)$^2$ | 25° C. | 65° C. | 70° C. | 45° C. | 72° C. | 42° C. | 70° C. |
| Total Process Time (2) (s) | 110 | 55 | 60 | 35 | 75 | 70 |  |
| Distance below IR heaters (1500 W except for Ex 8 12 W) mm | 80 | 50 | 50 | 80 | 50 | 80 | 50 |
| T(3) | 66° C. | 67° C. | 65° C. | 71° C. | 85° C. | 68° C. | 72° C. |
| T(3)$^1$ | 85° C. | 84° C. | 81° C. | 87° C. | 106° C. | 74° C. | 83° C. |
| T(3)$^2$ | 78° C. | 78° C. | 76° C. | 80° C. | 92° C. | 69° C. | 77° C. |
| Total Process Time(3) (s) | 249 | 138 | 202 | 85 | 106 | 120 | 85 |

-continued

| Parameter | Example 1 Cheddar cheese, solid 100 g | Example 2 Cheddar cheese, viscous 100 g | Example 3 Cheddar cheese, viscous 100 g | Example 4 Romano cheese, solid 25 g | Example 5 Romano cheese, viscous 100 g | Example 6 Pepato cheese, solid 50 g | Example 7 Pepato cheese, viscous 100 g |
|---|---|---|---|---|---|---|---|
| H(1) | 65 | 66 | 62 | 60 | 50 | 60 | 55 |
| H(2) | 60 | 30 | 35 | 60 | 35 | 55 | 60 |
| H(3) | <10 | <10 | <10 | <10 | <10 | <10 | <10 |
| P(1) | 1 atm | 1 atm | 1 atm | 1 atm | 1 atm | 1 atm | 1 atm |
| P(2) | 1 atm | 1 atm | 1 atm | 1 atm | 1 atm | 1 atm | 1 atm |
| P(3) | 1 atm | 1 atm | 1 atm | 1 atm | 1 atm | 1 atm | 1 atm |
| WBD(3)* | 36 | 36 | 35 | 38 | 40 | 36 | 40 |
| $T(3)^1 - T(3)^2$ | 7° C. | 6° C. | 5° C. | 7° C. | 14° C. | 5° C. | 6° C. |
| $[T(3)^1 - T(3)^2]/$ WBD(3) | 19% | 17% | 14% | 18% | 35% | 14% | 15% |

*WBD = Wet bulb depression

Example 8

This test example was carried out using an industrial microwave processing machine equipped with continuously variable microwave power control, processing environment temperature humidity and pressure control and set up with pre-processing by infra-red radiant heating and microwave radiation. The sample material was a molasses based raw material which exhibits similar processing characteristics to cheese based products.

A number of tests were carried out using different infra-red and microwave power inputs and processing times. Examples 8 used a 20 kg sample material and was typical of many tests. The finished product had less than 2.5% moisture content and was of crispy crunchy open cellular composition.

As in the case of the other Examples the measurement of the product temperatures and processing environment conditions of temperature, humidity and pressure were recorded throughout the process and are summarised as follows at the stabilised processing conditions for continuous flow production.

The data was as follows:

| | |
|---|---|
| Sample Material | 20 kg |
| Presented form | Extruded 200 mm wide × 20 mm thick |
| T(0) ° C. | 32 |
| T(1) ° C. | 40 |
| Microwave capacity in Step 2 | 20 KW (1–100%) |
| Infra-red capacity in Step 2 | 12 KW (4 × 3 KW) |
| T(2) ° C. | 64 |
| $T(2)^1$ ° C. | 72 |
| $T(2)^2$ ° C. | 80 |
| Distance below infra-red heaters | 150 mm |
| Process time in Step 2 (seconds) | 145 |
| Microwave capacity in Step 3 | 30 KW (1–100%) |
| T(3) ° C. | 92 |
| $T(3)^1$ ° C. | 116 |
| $T(3)^2$ ° C. | 98 |
| Process time (seconds) | 215 |
| H(1) % | 70 |
| H(2) % | 50 |
| H(3) % | 25 |
| P(1) | 1 atm |
| P(2) | −250 Pa |
| P(3) | −500 Pa |
| WBD(3) ° C. | 50 |
| $T(3)^1-T(3)^2$ ° C. | 18 |
| $T(3)^1-T(3)^2$ % WBD(3) | 36 |

Example 9

A number of crispy crunchy cellular cheese snack products were produced from a variety of cheese and cheese based starting materials in both viscous and solid start condition and of different weights, shapes and sizes and starting temperatures ranging from 4° C. to 90° C. In excess of 50 sample products were produced in a process incorporating the processing steps of the invention as well as including an initial step for the preparation and presentation of the start material followed by an initial processing step including microwave and infra-red radiant heating and a final microwave processing step under atmospheric and sub-atmospheric pressure conditions and in different combinations of these processes. The processing equipment used compressed a combination of domestic and industrial microwave processing equipment as described operating under controlled conditions.

By way of example a typical analyses of the cheese starting material and sample products was measured as follows:

| Item | Start Material | Typical Sample Products |
|---|---|---|
| Fat | 32–34% | 36.3% |
| Moisture | 34–37% | 3.6% |
| Salt | 1.4–1.8% | 3.2% |
| Dry matter (other) | 29–31% | 56.9% |
| pH | 4.5–5.0 | 5.0 |
| Fat in dry matter | 50–54% | 37.7% |

The sample products across the range of shapes and sizes were open cellular slightly puffed and of crispy crunchy textures, lightweight and tasty.

The average loss in weight between the finished product and the sheet material roughed from 40% to 56% depending mainly on the moisture content of the start material and fat content.

Depending on the degree of puffing (which is controlled by the process) the volumetric increase of the sample products with respect to the volume of the start material varied between 47% and 282%.

The physical form, weight, shape and dimensions of the starting material was recorded for each Example together with processing ambient conditions, product temperature (bulk and surface), infra-red and microwave power levels and process residence times in each processing step. Also final product weight and dimensions.

The resulting data has established the typical processing relationships between the start product variables and the microwave power input and process residence time for the specific product production. Processing data relating to three examples in this group of tests is detailed in Examples 1 to 3.

Example 10

A series of products were produced from a "Tasty Matured Cheddar Cheese" start material in solid and viscous form and of different weights and sizes. The products produced were uniformly conformably open cellular crispy crunchy cheese snacks which maintained a similar weight loss for the process across a range of processing temperatures from 66° to 90° C. and residence times ranging from 88 seconds to 240 seconds.

The end products were slightly puffed depending on the extent of infra-red pre-processing. The start material and finished product analyses was as follows:

| Item | Start Material | Typical Sample Product |
| --- | --- | --- |
| Fat in dry matter | 50–54% | 37.5% |
| Moisture | 34–38% | 4.7% |
| Total solids | 62–66% | 95.3% |

Example 11

A similar range of products as noted in Example 10 were produced in Example 11 using a "Romano" cheese as the starting material.

These samples were processed over a range of temperatures from 70° C. to 125° C. to produce a range of highly puffed cheese "cookies" and "buns" of the open cellular crispy crunchy form. Depending on the induced degree of puffing "the cellular structure varied over a range from uniform open cells to rough surface texture with explosive puffed openings. The comparative analyses of these samples was a follows:

| Item | Start Material Analysis | Typical Sample Products Analysis |
| --- | --- | --- |
| Fat in dry matter | 38–41% | 38.0% |
| Moisture | 38–40% | 8.0% |
| Total solids | 60–62% | 92.0% |

The processing data relating to these two examples in this series of tests are as for examples 4 and 5.

Example 12

A further series of products were produced in the same range as for Example 10 but using "Papato" cheese as the start material.

These samples were processed over a range of temperatures from 65° C. to 90° C. and produced a range of open cellular slightly puffed crispy cheese snack products generally similar to Examples 9 and 10. The comparative analysis of these products was as follows:

| Item | Start Material | Typical Sample Products |
| --- | --- | --- |
| Fat in dry matter | 48–51% | 25% |
| Moisture | 38–40% | 5.0% |
| Total solids | 60–62% | 95.0% |

The processing data relating to two examples in this series of tests is as for examples 6 and 7.

Shapes of Examples 9–12

Cheese Snack (Cracker different shapes and sizes generally below 50 mm×50 mm or 50 mm diameter.

Cheese Biscuits and Wafers

Any shape and sizes, typically up to 150 mm×100 mm but say size to suit commercial market.

Cheese "Cookie" or "Scone"

Typically less than 80 mm diameter and puffed to open cellular to semi-spherical shape or form. Puffed 15–25 mm in height.

Cheese Bun

Highly puffed. Typically more than 80 mm diameter and puffed to 25 mm or more in height.

Example 13

This example relates to an industrial animal feed product comprising a sugar cane molasses base material and additives of flour mill bran and pollard and calcium hydroxide in the approximate proportions:

| | |
| --- | --- |
| Molasses | 74%. |
| Mill Run | 24%. |
| Lime | 2% |

The typical analyses of molasses is:

| | |
| --- | --- |
| Sucrose | 35% |
| Reducing sugar | 15% |
| Inorganic products | 15% |
| Water | 20% |
| Organic products | 15% |

Sample products were produced from a viscous starting material at a temperature ranging from 20–40° C. introduced through an extruding device in the form of cylindrical pellets, continuous strips and large biscuit form.

The processing of the material was carried out under controlled atmosphere temperature and humidity at sub-atmospheric pressure in the range from 250–1000 Pa vacuum. The surface temperature of the material was controlled between 80–115° C. under various microwave power inputs and conveyor speeds. The sample products were puffed to varying degrees depending on the physical form of the entry material and in particular the surface area versus the volume of the entry material. All start material was reduced to a moisture content of less than 2.5% of final product weight and had an open cellular structure and crispy nature. The average 21% reduction in weight during processing was due to the reduction in water content and some losses of low temperature gum and wax volatiles. The processing data relating to one example in this group of tests is as per example 8.

Animal feed product in pellet form—typically 20–30 mm diameter and up to 50 mm in length. A biscuit form is typically in square or rectangular form in any dimensions to suit marketing. The product Can be further processed by hammer milling into a sugar like "pourable" material as a feed additive.

Example 14

Further tests have demonstrated that this process described in the invention is for example suitable for the drying of products such as meats, fish, poultry, fresh fruits, such as berries, vinecrops.

These products are all sensitive to drying conditions and in particular drying conditions which cause deterioration or hardening or discolouration of the surface of the product. The controlled processing environment conditions and ability to control the surface temperature of the product and the microwave input energy enable the above products to be dehydrated whilst retaining the quality of the fresh material in terms of colour, texture, skin properties, flavour and low volatilisation temperature aromatic compounds.

We claim:

1. A process of providing at least a partial barrier to moisture vapor transfer through the surface of a material without substantially spoiling the material, said process comprising:

(A) subjecting the material to a controlled temperature and humidity environment, said environment being at a temperature and partial vapor pressure of water which do not spoil the material, and, in which the partial vapor pressure of water of said environment is below saturation;

(B) irradiating the material in the environment with infra-red radiation, said amount of infra red radiation being sufficient to at least partially seal the surface of the material to provide at least a partial barrier to moisture vapor transfer through the surface of the material without spoiling the material; and (C) maintaining (i) the temperature of the environment, and, (ii) the partial vapor pressure of water of said environment below saturation, whereby the material is not spoiled during step (B).

2. A process for removing moisture from a material without substantially spoiling the material, said process comprising:

(a) subjecting the material to a controlled humidity environment, said environment being at a temperature and partial vapor pressure of water which do not spoil the material, and, in which the partial vapor pressure of water of said environment is below saturation;

(b) irradiating the material in the environment with an amount of microwave irradiation effective to increase the moisture at the surface of the material whereby the vapor pressure at the surface is greater than the vapor pressure of the environment whereby moisture is transferred from the surface to the environment, wherein the amount of said microwave irradiation is not sufficient to spoil the material; and (c) maintaining (i) the temperature of the environment, and, (ii) the partial vapor pressure of water of said environment below saturation, whereby the material is not spoiled during step (b); said environment having a wet bulb depression and said amount of microwave irradiation being sufficient to substantially maintain said vapor pressure at the surface, until a required amount of moisture has been removed from said material, without reducing the surface temperature of the material more than 50% of the wet bulb depression of the environment.

3. A process of providing at least a partial barrier to moisture vapor transfer through the surface of a material and for removing moisture from the material without substantially spoiling the material, said process comprising:

providing at least a partial barrier to moisture vapor through the surface of a material without substantially spoiling the material, by:

(A) subjecting the material to a controlled temperature and humidity environment, said environment being at a temperature and partial vapor pressure of water which do not spoil the material, and, in which the partial vapor pressure of water of said environment is below saturation;

(B) irradiating the material in the environment with infra red radiation, said amount of infrared radiation being sufficient to at least partially seal the surface of the material providing at least a partial barrier to moisture vapor transfer through the surface of the material without spoiling the material; and (C) maintaining (i) the temperature of the environment, and, (ii) the partial vapor pressure of water of said environment below saturation, whereby the material is not spoiled during step (B); and removing moisture from the material without substantially spoiling the material, by:

(a) subjecting the material to a controlled humidity environment, said environment being at a temperature and partial vapor pressure of water which do not spoil the material, and, in which the partial vapor pressure of water of said environment is below saturation;

(b) irradiating the material in the environment with an amount of microwave irradiation effective to increase the moisture at the surface of the material whereby the vapor pressure at the surface is greater than the vapor pressure of the environment so that moisture is transferred from the surface to the environment, wherein the amount of said microwave irradiation is not sufficient to spoil the material; and (c) maintaining (i) the temperature of the environment, and, (ii) the partial vapor pressure of water of said environment below saturation, whereby the material is not spoiled during step (b); said environment having a wet bulb depression and said amount of microwave irradiation being sufficient to substantially maintain said vapor pressure at the surface, until a required amount of moisture has been removed from said material, without reducing the surface temperature of the material more than 50% of the wet bulb depression of the environment.

4. The process of claim 1 wherein step (B) comprises:

simultaneously or sequentially irradiating the material in the environment with infra red radiation and microwave irradiation, said amount of infra red radiation being sufficient to at least partially seal the surface of the material to provide at least a partial barrier to moisture vapor transfer through the surface of the material without spoiling the material, and said amount of microwave irradiation being sufficient to cause a slight positive vapor pressure within the material to prevent the material from deflating, wherein the amount of said microwave irradiation is not sufficient to spoil the material.

5. The process of claim 1 wherein step (A) comprises:

subjecting the material to a controlled pressure, temperature and humidity environment, said environment being at a pressure which does not spoil the material.

6. The process of claim 2 wherein:

said amount of microwave irradiation being sufficient to substantially maintain said vapor pressure at the surface, until a required amount of moisture has been removed from said material, without reducing the surface temperature of the material more than 30% of the wet bulb depression of the environment.

7. The process of claim 2 wherein:

said amount of microwave irradiation is sufficient to substantially maintain said vapor pressure at the surface, until a required amount of moisture has been removed from said material, without substantial reduction of the surface temperature of the material.

8. The process of claim 2 wherein step (a) comprises:

subjecting the material to a controlled temperature and humidity environment, said environment being at a temperature and partial vapor pressure of water which do not spoil the material, and, in which the partial vapor pressure of water of said environment is below saturation.

9. The process of claim 2 wherein step (a) comprises:

subjecting the material to a controlled pressure and humidity environment, said environment being at a pressure, temperature and partial vapor pressure of water which do not spoil the material, and, in which the partial vapor pressure of water of said environment is below saturation.

10. The process of claim 2 wherein step (a) comprises:

subjecting the material to a controlled pressure, temperature and humidity environment, said environment being at a pressure, temperature and partial vapor pressure of water which do not spoil the material, and, in which the partial vapor pressure of water of said environment is below saturation.

11. The process of claim 2 wherein in step (b) the environment has a day bulb temperature and the surface of the material has a temperature which is substantially the same as the dry bulb temperature of the environment.

12. The process of claim 1 wherein the material is selected from the group consisting of natural and processed cheeses and dairy products, meats, fish, fruits, vine products, herbs, condiments raw spice materials, natural and semi-processed vegetable produce, cereal grains, nuts, seeds, nudular and granular products, agricultural waste products; recovered chemical compound, paper pulp products, wood chips, sawdust, dehydrated chemical powder compounds, sugar cane molasses and sugar beet molasses.

13. The process of claim 1 wherein the material is selected from the group consisting of natural cheeses, processed cheese, cheese based mixtures, condiments, marine plants, protein sources, cereals, nuts, flesh of prawns, shrimps, Balmain bugs, pippies, flesh of turtles, octopus, squid, flesh of lobsters, flesh of cryfish, flesh of crabs, marine mammals and fish, animal meats, flowering plants, vegetables, beans, peanuts, soya extracts, natural and processed diary products, fruits, vine products, fruit skins, fruit seeds, herbs, raw spice materials, seeds, nodular and granular products, agricultural waste products, recovered chemical compound, paper pulp products, wood chips, sawdust, dehydrated chemical powder compounds, honey, treacle, sugar cane molasses and sugar beet molasses.

14. An apparatus for providing at least a partial barrier to moisture vapor transfer through the surface of a material without substantially spoiling the material, said apparatus comprising;

(A) means for subjecting the material to a controlled temperature and humidity environment, said environment being at a temperature and partial vapor pressure of water which do not spoil the material, and, in which the partial vapor pressure of water of said environment is below saturation;

(B) means for irradiating the material in the environment with infra red radiation, said amount of infra red radiation being sufficient to at least partially seal the surface of the material to provide at least a partial barrier to moisture vapor transfer through the surface of the material without spoiling the material; and (C) means for maintaining (i) the temperature of the environment, and, (ii) the partial vapor pressure of water of said environment below saturation, whereby the material is not spoiled.

15. An apparatus for removing moisture from a material without substantially spoiling the material, said apparatus comprising:

(a) means for subjecting the material to a controlled humidity environment, said environment being at a temperature and partial vapor pressure of water which do not spoil the material, and, in which the partial vapor pressure of water of said environment is below saturation;

(b) means for irradiating the material in the environment with an amount of microwave irradiation effective to increase the moisture at the surface of the material whereby the vapor pressure at the surface is greater than the vapor pressure of the environment whereby moisture is transferred from the surface to the environment, wherein the amount of said microwave irradiation is not sufficient to spoil the material; and (c) means for maintaining (i) the temperature of the environment, and, (ii) the partial vapor pressure of water of said environment below saturation, whereby the material is not spoiled, said environment having a wet bulb depression and said amount of microwave irradiation being sufficient to substantially maintain said vapor pressure at the surface, until a required amount of moisture has been removed from said material, without reducing the surface temperature of the material more than 50% of the wet bulb depression of the environment.

16. A system for providing at least a partial barrier to moisture vapor transfer through the surface of a material and for removing moisture from the material without substantially spoiling the material, said system comprising in combination:

an apparatus for providing at least a partial barrier to moisture vapor transfer through the surface of a material without substantially spoiling the material, said apparatus for providing at least a partial barrier to moisture vapor transfer comprising:

(A) means for subjecting the material to a controlled temperature and humidity environment, said environment being at a temperature and partial vapor pressure of water which do not spoil the material, and, in which the partial vapor pressure of water of said environment is below saturation;

(B) means for irradiating the material in the environment with infra red radiation, said amount of infra red radiation being sufficient to at least partially seal the surface of the material to provide at least a partial barrier to moisture vapor transfer through the surface of the material without spoiling the material; and (C) means for maintaining (i) the temperature of the environment, and, (ii) the partial vapor pressure of water of said environment below saturation, whereby the material is not spoiled; and an apparatus for removing moisture from the material without substantially spoiling the material, said apparatus for removing moisture comprising:

(a) means for subjecting the material to a controlled humidity environment, said environment being at a temperature and partial vapor pressure of water which do not spoil the material, and, in which the partial vapor pressure of water of said environment is below saturation;

(b) means for irradiating the material in the environment with an amount of microwave irradiation effective to increase the moisture at the surface of the material whereby the vapor pressure at the surface is greater than the vapor pressure of the environment so that moisture is transferred from the surface to the environment, wherein the amount of said microwave irradiation is not sufficient to spoil the material; and (c) means for maintaining (i) the temperature of the environment, and, (ii) the partial vapor pressure of water of said environment below saturation, whereby the material is not spoiled; said environment having a wet bulb depression and said amount of microwave irradiation being sufficient to substantially maintain said vapor pressure at the surface, until a required amount of moisture has been removed from said material, without reducing the surface temperature of the material more than 50% of the wet bulb depression of the environment.

17. The apparatus of claim 14 wherein (B) comprises:

means for simultaneously or sequentially irradiating the material in the environment with infra red radiation and microwave irradiation, said amount of infra red radiation being sufficient to at least partially seal the surface of the material to provide at least a partial barrier to moisture vapor transfer through the surface of the material without spoiling the material, and said amount of microwave irradiation being sufficient to cause a slight positive vapor pressure within the material to prevent the material from deflating, wherein the amount of said microwave irradiation is not sufficient to spoil the material.

18. The apparatus of claim 14 wherein (A) comprises:

means for subjecting the material to a controlled pressure, temperature and humidity environment, said environment being at a pressure which does not spoil the material.

19. The apparatus of claim 15 wherein (a) comprises:

means for subjecting the material to a controlled temperature and humidity environment, said environment being at a temperature and partial vapor pressure of water which do not spoil the material, and, in which the partial vapor pressure of water of said environment is below saturation.

20. The apparatus of claim 15 wherein (a) comprises:

means for subjecting the material to a controlled pressure and humidity environment, said environment being at a pressure, temperature and partial vapor pressure of water which do not spoil the material, and, in which the partial vapor pressure of water of said environment is below saturation.

21. The apparatus of claim 15 wherein (a) comprises:

means for subjecting the material to a controlled pressure, temperature and humidity environment, said environment being at a pressure, temperature and partial vapor pressure of water which do not spoil the material, and, in which the partial vapor pressure of water of said environment is below saturation.

22. The process according to claim 13 wherein the natural cheeses and processed cheeses include additives selected from the group consisting of carbohydrates, cereals, proteins, meats, fruits, nuts, minerals, vegetables, coloring, flavoring, sodium and non-sodium emulsifiers, and eggs.

23. The process according to claim 13 wherein the protein sources are selected from the group consisting of egg protein, soy protein, milk protein, gluten or caseinate optionally emulsified with plant or animal fat or oils together with water.

* * * * *